(12) United States Patent
Wang et al.

(10) Patent No.: US 9,213,323 B2
(45) Date of Patent: Dec. 15, 2015

(54) OSCILLATORY FAILURE COMMON-MODE MONITOR

(71) Applicant: The Boeing Company, Chicago, IL (US)

(72) Inventors: Fenfei (Bruce) Wang, Bothell, WA (US); Dennis Jon Asheim, Carnation, WA (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 13/765,385

(22) Filed: Feb. 12, 2013

(65) Prior Publication Data

US 2014/0228981 A1    Aug. 14, 2014

(51) Int. Cl.
| | | |
|---|---|---|
| *G06F 11/00* | (2006.01) | |
| *G05B 13/02* | (2006.01) | |
| *G05D 1/00* | (2006.01) | |

(52) U.S. Cl.
CPC ............ *G05B 13/024* (2013.01); *G05D 1/0066* (2013.01)

(58) Field of Classification Search
CPC ..... G05B 13/02; G05B 13/024; G05D 1/0066
USPC ............................................... 700/32; 702/58
See application file for complete search history.

(56) References Cited

U.S. PATENT DOCUMENTS

| | | | | |
|---|---|---|---|---|
| 4,566,101 | A * | 1/1986 | Skonieczny et al. | 714/706 |
| 5,319,296 | A * | 6/1994 | Patel | 318/611 |
| 5,598,991 | A * | 2/1997 | Nadkarni et al. | 244/203 |
| 5,806,805 | A * | 9/1998 | Elbert et al. | 244/195 |
| 5,923,030 | A * | 7/1999 | Assard et al. | 250/227.19 |
| 7,567,862 | B2 | 7/2009 | Pelton et al. | |
| 2003/0205644 | A1* | 11/2003 | Najmabadi et al. | 244/195 |
| 2007/0124038 | A1* | 5/2007 | Goupil | 701/29 |
| 2009/0309574 | A1 | 12/2009 | Goupil et al. | |
| 2010/0127132 | A1* | 5/2010 | Kirkland | 244/76 R |
| 2010/0152925 | A1* | 6/2010 | Goupil et al. | 701/3 |
| 2011/0040430 | A1* | 2/2011 | Tessier | 701/3 |
| 2013/0325254 | A1* | 12/2013 | Goupil et al. | 701/33.9 |
| 2014/0228981 | A1* | 8/2014 | Wang et al. | 700/32 |

OTHER PUBLICATIONS

Sachs, H., Gojny, M., and Carl, U., "Robust Detection of Oscillatory and Transient Aircraft Actuation System Failures Using Analytical Redundancy," 09ATC-0105; SAE International; Nov. 10, 2009; SAE Technical Paper 2009-01-3175; (16 pgs).

Extended European Search Report for Application No. 14154896.6, dated Jul. 24, 2014, 11 pages.

Goupil, P., "AIRBUS State of the Art and Practices on FDI and FTC in Flight Control System," Control Engineering Practice, vol. 19, Issue 6, Jun. 2011, pp. 524-539.

Goupil, P., "Oscillatory Failure Case Detection in the A380 Electrical Flight Control System by Analytical Redundancy," Control Engineering Practice, vol. 18, Issue 9, Sep. 2010, pp. 1110-1119.

* cited by examiner

*Primary Examiner* — Michael D Masinick

(74) *Attorney, Agent, or Firm* — Toler Law Group, PC

(57) ABSTRACT

A method includes receiving signals processed according to a control law and generating an error signal based on the signals. The method includes determining at least one characteristic of the error signal, and determining whether to disable the control law based on the at least one characteristic.

20 Claims, 12 Drawing Sheets

OSCILLATORY FAILURE COMMON-MODE MONITOR

FIELD

The present disclosure is generally related to oscillatory failure common-mode monitor systems.

BACKGROUND

Control laws (CLAWs) may be used to enhance and improve ride quality of an aircraft when components (e.g., wings, horizontal stabilizers, etc.) of the aircraft are exposed to unsteady external forces (e.g., wind or turbulence). One or more sensors may be coupled to the components of the aircraft to detect the presence of these external forces. Under certain system failure conditions, the sensors may generate an erroneous oscillatory signal that is provided to a flight control computer of the aircraft. The flight control computer processes the oscillatory signal based on one or more CLAWs to generate commands that control operations of the aircraft. Processing the oscillatory signals based on the one or more CLAWs includes amplifying the oscillatory signal. The commands generated by the flight control computer may be used to modify or augment commands generated by pilot operated controls.

For example, an aircraft may experience a random lift variation (e.g., an increase in altitude) due to upward forces (e.g., lifting forces) when surfaces of the components of the aircraft are exposed to vertical gust. The lifting forces may be detected by the sensors which feed back to the flight control computer. Based on the signal received from the sensors, the flight control computer may command control surfaces to counteract the detected lifting forces, resulting in a smoother and more comfortable ride for the passengers on board the aircraft. However, the erroneous oscillatory sensor signals may lead to a sustained control surfaces oscillation which may cause aircraft structure fatigue damage.

Sustained oscillatory commands generated by a flight control computer may increase dynamic loads on the components of an aircraft. The aircraft components may be designed to withstand a particular dynamic load threshold (e.g., a surface load allowable) for a period of time. The flight control computer may monitor the sensor input signals to detect oscillatory failures. Oscillatory failures indicate that the components of the aircraft have experienced dynamic loads at or above the dynamic load thresholds for the period of time. When an oscillatory failure is detected, the flight control computer may deactivate the affected CLAWs, removing the induced dynamic loads on the components of the aircraft.

A nuisance trip occur when the oscillatory failure monitor is unable to distinguish the oscillatory failure signals from the normal signal variations that account for all dynamic loads experienced by the components of the aircraft in real-time. As such, because an oscillatory failure monitor does not account for the dynamic loads caused by the commands generated using certain CLAWs due to the nuisance trip concerns, there may be a aircraft system failure condition that may cause the dynamic loads experienced by the components of the aircraft to exceed the dynamic load threshold for longer than the duration of the period of time, leading to a true aircraft structure failure.

SUMMARY

Embodiments of an oscillatory failure common mode monitor (OFCM) system are disclosed. The OFCM system is configured to receive a true signal of similar sensors and a synthetic signal of dissimilar sensors and to process the signals according to at least one control law (CLAW). The signals may be processed by a flight control computer including an OFCM module. The OFCM module may be configured to detect real-time dynamic loads experienced by components of an aircraft caused by the CLAW commands generated in response to processing a true sensor common-mode oscillatory failure signals. The OFCM system can isolate the concerned sensor signal oscillatory failures before the induced dynamic loads exceed the design limits and eliminate the occurrence of nuisance trips for one or more CLAWs (e.g., a vertical gust suppression CLAW) and improve the ride quality and safety of passengers traveling onboard an aircraft that includes the OFCM system.

In an embodiment, a method includes receiving signals processed according to a control law (CLAW) and generating an error signal based on the signals. The method includes determining at least one characteristic of the error signal and determining whether to disable the CLAW based on the at least one characteristic.

In another embodiment, a system includes a processor, a demodulation module, a detection management module, and a monitoring module. The demodulation module may be executable by the processor to receive signals processed according to a control law (CLAW) and to generate an error signal based on the signals. The detection management module may be executable by the processor to determine at least one characteristic of the error signal and calculate the real-time monitoring parameters. The monitoring module executable by the processor to determine whether to disable the CLAW based on the at least one characteristic.

In another embodiment, a computer-readable storage medium includes instructions that, when executed by a processor, cause the processor to receive signals processed according to a control law (CLAW). The computer-readable storage medium also includes instructions that, when executed by the processor, cause the processor to generate an error signal based on the signals. The computer-readable storage medium also includes instructions that, when executed by the processor, cause the processor to determine at least one characteristic of the error signal. The computer-readable storage medium also includes instructions that, when executed by the processor, cause the processor to determine whether to disable the CLAW based on the at least one characteristic.

DETAILED DESCRIPTION

Figure 1:
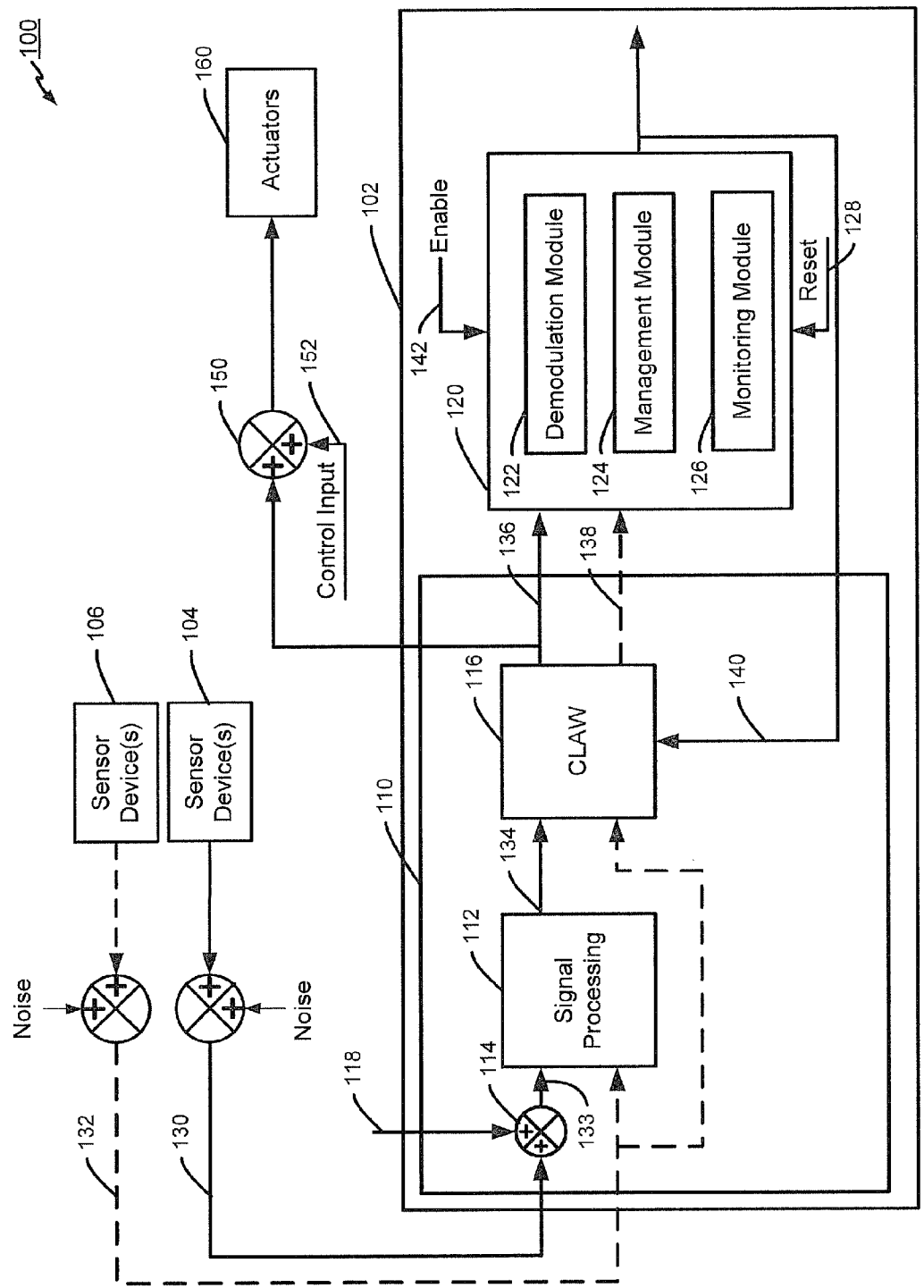
FIG. 1 is an illustrative embodiment of a system including a flight control computer configured to perform oscillatory failure common mode monitoring.

Referring to FIG. 1, an illustrative embodiment of a system 100 including a flight control computer 102 configured to perform oscillatory failure common mode monitoring is shown. As shown in FIG. 1, the flight control computer 102 includes a signal processor 110 and an oscillatory failure common-mode monitor (OFCM) module 120. The flight control computer 102 may be coupled to a first sensor device(s) 104, to a second sensor device(s) 106, and to actuators 160. In an embodiment, the flight control computer 102 is a multi sample rates flight control computer and the signal processor 110 may operate with a first sample rate (e.g., a high sample rate) and the OFCM module 120 may operate with a second sample rate (e.g., a low sample rate.

The first sensor device(s) 104 may be configured to detect a particular condition (e.g., a dynamic load) experienced by a particular aircraft component (e.g., a wing, a vertical stabilizer, a horizontal stabilizer, etc.). When the sensor device(s) 104 detects the particular condition, the sensor device(s) 104 may generate a signal 130 (e.g., a voltage signal) indicative of the particular condition (e.g., the dynamic load) experienced by the particular aircraft component. In a particular embodiment, the first sensor device(s) 104 may correspond to a high availability/high integrity sensor, such as an angle of attack sensor.

The second sensor device(s) 106 may generate a signal 132 (e.g., a voltage signal). The flight control computer 102 may use the signal 132 as a reference signal with respect to the signal 130. The second sensor device(s) 106 correspond to sensors of a different type than the sensor device(s) 104. For example, the first sensor device(s) 104 may correspond to sensors of a first sensor type (e.g., the angle of attack sensor) and the second sensor device(s) 106 may correspond to sensors of a second sensor type that is different than the first sensor type. The signal 132 generated by the second sensor device(s) 106 may be processed according to an algorithm to generate the reference signal (e.g., the signal 132). The reference signal may be representative of an estimate of the signal 130 generated by the sensor device(s) 104 and may be calculated based on the signal 132.

The signals 130, 132 may be received at the flight control computer 102 and provided to the signal processor 110. The signal processor 110 may provide the signal 130 to oscillatory signal logic 114. The oscillatory signal logic 114 may be configured to apply a signal 118 to the signal 130 to generate an oscillatory signal 133. In a particular embodiment, the signal 118 may be a postulated oscillatory failure signal that is either intermittent or continuous. Under particular conditions, the signal 118 may override the signal 130 to become the signal 133. A signal processing module 112 may receive the oscillatory signal 133 from the oscillatory signal logic 114 and may receive the signal 132. The signal processing module 112 processes the oscillatory signal 133 based at least in part on the signal 132 to generate a signal 134. In a particular embodiment, the signal 134 corresponds to the signal 130 after being processed by the oscillatory signal logic 114 and the signal processing module 112. The signal processing module 112 provides all required universal sensor input signal selections and fault detections before the CLAW module 116 uses them. The OFCM module 120 is configured to detect the oscillatory failure signal 118 that the signal processing module 112 cannot detect due to nuisance trip concerns.

The CLAW processing module 116 may receive the signal 134 from the signal processing module 112. The signal 132 may be provided from the signal processor 110 directly to (i.e., without being processed by the signal processing module 112) the CLAW processing module 116. The CLAW processing module 116 may generate, based at least in part on the signal 134 and the signal 132, a signal 136 and a signal 138 as output. Because the CLAW processing module 116 may provide additional signal processing/conditioning features such as band-pass filtering, nonlinear limits, and flight condition specific function engagement logics, etc, passing signal 134 and 132 through the CLAW processing module 116 may limit the OFCM coverage to the oscillatory failures that can actually exceed the dynamic loads allowable limits. The signal 136 corresponds to the signal 130 after being processed by the oscillatory signal logic 114, the signal processing module 112, and the CLAW processing module 116. The signal 138 corresponds to the signal 132 after being processed by the CLAW processing module 116.

In a particular embodiment, the CLAW processing module 116 may be associated with a particular CLAW. For example, CLAW processing module 116 may be configured to processes signals (e.g., the signals 132, 134) based on a control law associated with vertical gust. In another embodiment, the signal processor 110 may include other CLAW processing modules associated with other CLAWs (e.g., CLAW processing modules associated with primary flight control functions, high lift control functions, and autoflight control functions).

The signal 136 may be provided to processing logic 150. The processing logic 150 may correspond to a portion of a fly-by-wire control system of the aircraft and may generate commands that control the operations of the actuators 160. In an embodiment, the processing logic 150 may also receive a control input 152 corresponding to commands generated by controls of the aircraft operated by a pilot. In this embodiment, the processing logic 150 may add the signal 136 and the control input 152 to generate commands that are provided to the actuators 160. The commands may correspond to commands configured to offset the effects of the conditions detected by the sensor device(s) 104, the sensor device(s) 106, or both. By counteracting the effects of the conditions experienced by the components of the aircraft, the dynamic loads on the components of the aircraft may increase. The OFCM module 120 may be configured to monitor the dynamic loads and to detect oscillatory failures (e.g., detect when the dynamic loads exceed a threshold) based on the signals 136, 138.

As shown in FIG. 1, the OFCM module 120 includes a demodulation module 122, a management module 124, and a monitoring module 126. The OFCM module 120 may receive the signals 136, 138 from the CLAW processing module 116. The OFCM module 120 may be configured to generate a latched fault signal 140 based at least in part on the signal 136, the signal 138, and an enable signal 142. The latched fault signal 140 may be used by the flight control computer 102 to selectively enable or disable the CLAW processing module 116. When the CLAW processing module 116 is disabled, the commands provided to the actuators 160 by the processing logic 150 may correspond to commands received from the control input 152 and may not be modified based on the signal 136 (e.g., the actuators 160 are controlled by only the control input 152). Thus, when the CLAW processing module 116 is disabled, the dynamic loads experienced by the components of the aircraft may be reduced because the signal 136 is not used to modify the control input 152 to counteract the conditions detected by the sensor device(s) 104. Additionally, because the control input 152 and/or aerodynamic gust/turbulence affect both the sensor device(s) 104, 106, the difference between signal 136 and 138 is adequately small when compared to the dynamic load limits after the signal is processed at the demodulation module 122. Therefore, the OFCM module 120 is operable to perform oscillatory failure monitoring in real-time while reducing nuisance trips.

During operation, the demodulation module 122 may be configured to receive the signals 136, 138 from the CLAW processing module 116, and to generate an error signal based on the signals 136, 138. The error signal corresponds to a difference between the signal 136 and the signal 138. The demodulation module 122 may be configured to provide the error signal to the management module 124.

The management module 124 may be configured to determine a characteristic (e.g., a frequency) of the error signal, and to generate one or more real-time OFCM detection monitor parameters based on the characteristic of the error signal. The management module 124 provides the OFCM detection monitor parameters to the monitoring module 126.

The monitoring module 126 may be configured to receive the error signal and the OFCM detection monitor parameters from the management module 124 and to generate the latched fault signal 140. The latched fault signal 140 may cause the signal processor 110 to disable the CLAW processing module 116. Illustrative embodiments of methods and logic configured to perform the various functions of the OFCM module 120, the demodulation module 122, the management module 124, and the monitoring module 126 are described with reference to FIGS. 2-10. Thus, the flight control computer 102 including the OFCM module 120 may be configured to perform OFCM monitoring using real-time dynamic load calculations.

Figure 2:
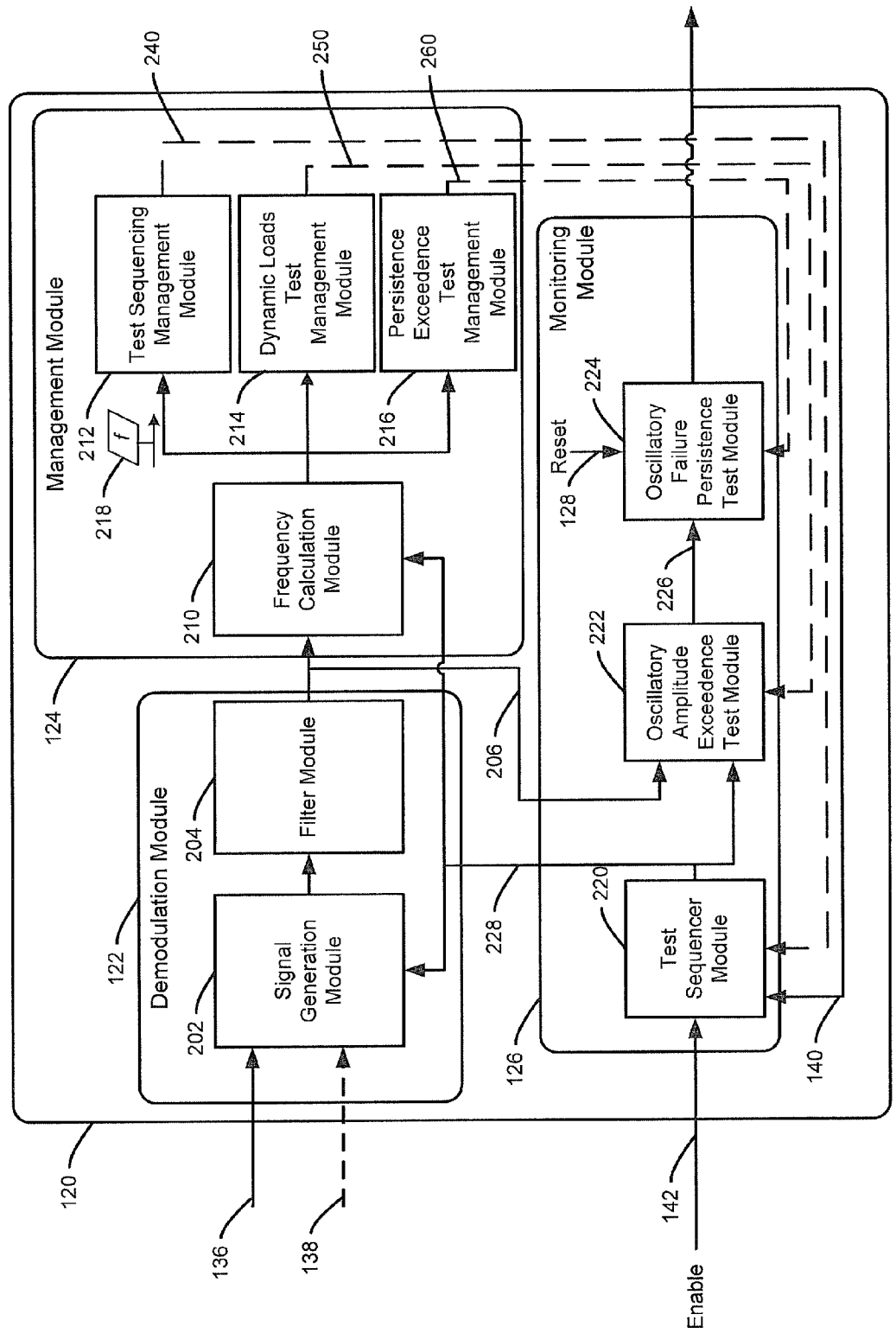
FIG. 2 is an illustrative embodiment of the OFCM module of FIG. 1.

Referring to FIG. 2, an illustrative embodiment of the OFCM module 120 of FIG. 1 is shown. As shown in FIG. 2, the OFCM module 120 includes the demodulation module 122, the management module 124, and the monitoring module 126. The demodulation module 122 includes a signal generation module 202 and a filter module 204. The management module 124 includes a frequency calculation module 210, a test sequencing management module 212, a dynamic loads test management module 214, and a persistence exceedance test management module 216. The monitoring module 126 includes a test sequencer module 220, an oscillatory amplitude exceedence test module 222, and an oscillatory failure persistence test module 224.

During operation, the OFCM module 120 may receive the signals 136, 138 from the signal processing module 112, as described with reference to FIG. 1. The OFCM module 120 may provide the signals 136, 138 to the demodulation module 122. The demodulation module 122 may provide the signals 136, 138 to the signal generation module 202 where the signals 136, 138 are processed to generate an error signal 206. The error signal 206 may be generated after applying a time delay phase compensation to the signal 136 and the signal 138. An illustrative embodiment of logic configured to generate the error signal 206 is described with reference to FIG. 3.

Delays (e.g., transport delays) may be introduced into the signals (e.g., the signals 136, 138) prior to the signals being received at the OFCM module 120. Due to the asynchronous nature of flight control computer signal processing, a false oscillatory failure may lead to the nuisance trips during OFCM as result of bad data contiguity between two comparison signal inputs (e.g., the signals 136, 138). The demodulation module 122 may be configured to account for the delays by compensating for a difference in phase of the signals (e.g., a difference between a phase of the signal 136 and a phase of the signal 138). For example, the demodulation module 122 may be configured to identify a particular delayed signal having a phase that correlates to the phase of the signal 138. In a particular embodiment, the signal generation module 202 may be configured to apply a first phase delay, a second phase delay, and a third phase delay to the signal 136 to generate a first delayed signal, a second delayed signal, and a third signal. The first delayed signal may correspond to the signal 136 having a zero (0) delay, the second delayed signal may correspond to the signal 136 having a first non-zero delay, and the third delayed signal may correspond to the signal 136 having a second non-zero delay that is distinct from the first non-zero delay. In a particular embodiment, the first non-zero delay may correspond to a one (1) computer frame time delay and the second non-zero delay may correspond to a two (2) computer frames time delay.

The demodulation module 122 may use linear correlation to identify which one of delayed signals (e.g., the first delayed signal, the second delayed signal, and the third delayed signal) has a phase that most closely matches the signal 138 (e.g., the phase of the reference signal). The linear correlation may be determined according to the following equation:

$$\gamma_{xy} = \frac{1}{N-1} \sum_{i=1}^{N} \text{sign}(x_i y_i) \qquad \text{EQ-1}$$

In equation 1 (EQ-1), $\gamma_{xy}$ corresponds to a linear correlation between the reference signal (e.g., the signal 138) and a particular delayed signal (e.g., one of the first delayed signal, the second delayed signal, and the third delayed signal), N corresponds to a number of frames (e.g., samples of the signals 136, 138) sampled by the demodulation module 122 in a period of time, $x_i$ corresponds to a signed value (e.g., +1, 0, -1) representative of the signal 136, and $y_i$ corresponds to a signed value (e.g., +1, 0, -1) representative of the signal 138. The demodulation module 122 may calculate $\gamma_{xy}$ for each frame time to determine which of the delayed signals has a smallest phase difference relative to the signal 138.

For example, when the phase of a particular delayed signal (e.g., one of the first delayed signal, the second delayed signal, and the third delayed signal) is in synch with the phase of the signal 138, the value of $\gamma_{xy}$ will be larger than when the phases of the particular delayed signal and the signal 138 are out of synch. To illustrate, when the phases are in synch, the signed values of $x_i y_i$ will be zero (0) or positive (+1). When the phases are out of synch, the signed values of $x_i y_i$ may be zero (0), positive one (+1), or negative one (-1). Over time, the value of $\gamma_{xy}$ for a particular delayed signal will constantly increase when the phases are synched because there will be no negative values, whereas, over time, the value of $\gamma_{xy}$ for other particular delayed signals may periodically decrease when the phases are out of synch because of the possibility of $x_i y_i$ having a value of negative one (-1). Thus, the linear correlation may be determined by selecting the particular delayed signal having the highest value $\gamma_{xy}$ after sampling N frames for each of the delayed signals 136.

After identifying the particular delayed signal having a phase that most closely correlates to a phase of the signal 138, the signal generation module 202 may be configured to determine a difference between the signal 138 and the particular delayed signal. The signal generation module 202 may be configured to generate the error signal 206 based on the difference between the signal 138 and the particular delayed signal. The demodulation module 122 may be configured to provide the error signal 206 from the signal generation module 202 to the filter module 204. An illustrative embodiment of logic configured to solve EQ-1 and to generate the error signal is described with reference to FIG. 3.

To improve the signal to noise ratio and to enhance the OFCM effectiveness, a band-pass filter may be applied in filter module 204 if necessary. In an embodiment, the filter module 204 may be a highpass filter or a washout filter or a pass-through if the CLAW does all the required signal filtering.

In a particular embodiment, the demodulation module 122 may not include the filter module 204. For example, when the CLAW processing module 116 of FIG. 1 includes a filter (e.g., a highpass filter or a washout filter), the demodulation module 122 may not include the filter module 204 or the filter module 204 may be a different type of filter (e.g., a passthrough filter). After filtering the error signal 206 at the filter module 204, the demodulation module 122 may be configured to provide the error signal 206 to the management module 124 and the monitoring module 126.

The management module 124 may be configured to receive the error signal 206 from the demodulation module 122 and to provide the error signal 206 to the frequency calculation module 210. The frequency calculation module 210 may be configured to determine a frequency 218 based on the error signal 206. In a particular embodiment, the frequency 218 may correspond to a signal curve or oscillatory representative of the frequency 218. An illustrative embodiment of the signal curve representative of the frequency 218 is described with reference to FIG. 9. In a particular embodiment, the frequency calculation module 210 may determine the frequency 218 of the error signal 206 using a zero crossing method. An illustrative embodiment of logic configured to determine a frequency (e.g., the frequency 218) of an error signal (e.g., the error signal 206) using the zero crossing method is described with reference to FIG. 4.

The management module 124 may be configured to generate one or more control signals based at least in part on the frequency 218. For example, the frequency calculation module 210 may be configured to provide the frequency 218 of the error signal 206 to the test sequencing management module 212, to the dynamic loads test management module 214, and to the persistence exceedence test management module 216. The test sequencing management module 212 may be configured to receive the frequency 218 from the frequency calculation module 210 and to generate an OFCM detection monitor parameter 240 based on the frequency. In a particular embodiment, the OFCM detection monitor parameter 240 may designate or define an amplitude exceedence test window that is used by the monitoring module 126 to initiate dynamic loads exceedence testing. The OFCM detection monitor parameter 240 may be determined based on the frequency (f) 218 received from the frequency calculation module 210 according to the following equation:

$$T_{on} = \frac{N_{on}}{f} \quad \text{EQ-2}$$

$$T_{off} = \frac{N_{off}}{f}$$

In equation 2 (EQ-2), $N_{on}$ represents a number of cycles of the error signal 206 to be tested within each amplitude exceedence test window, and $N_{off}$ represents a number of cycles of the error signal 206 that are not to be tested within each amplitude exceedence test window. In a particular embodiment, the variables $N_{on}$ and $N_{off}$ may be preconfigured values determined based design parameters of the OFCM module 120, the CLAW processing module 116, the components of the aircraft, the sensor devices 104, the second sensor devices 106, or a combination thereof. The variable f corresponds to the frequency 218 determined by the frequency calculation module 210. The amplitude exceedence test window corresponds to $T_{on}+T_{off}$. In EQ-6, $T_{on}$ corresponds to an amount of time that oscillatory failure monitoring is to be performed and $T_{off}$ corresponds to an amount of time within the amplitude exceedence test window that the oscillatory failure monitoring is not to be performed. To illustrate, when the OFCM detection monitor parameter 240 corresponds to $T_{on}$ the monitoring module 126 performs oscillatory failure monitoring and when the OFCM detection monitor parameter 240 corresponds to $T_{off}$ the monitoring module 126 performs oscillatory failure monitoring. The test sequencing management module 212 may be configured to provide the OFCM detection monitor parameter 240 to the monitoring module 126.

The dynamic loads test management module 214 may be configured to receive the frequency 218 from the frequency calculation module 210 and to generate an OFCM detection monitor parameter 250 based on the frequency 218. For example, dynamic loads test management module 214 may generate the OFCM detection monitor parameter 250 according to the following equations:

$$A_{(0-p)} = \frac{\pi}{2 \cdot T} \cdot \int_0^T |\delta(t)| \cdot dt \quad \text{EQ-3}$$

In equation 3 (EQ-3), $A_{(0-p)}$ corresponds to an 0-peak amplitude of an energy equivalent sinusoidal signal with the same frequency as of the frequency 218, T corresponds to a period of the frequency 218, $\delta(t)$ corresponds to an actual amplitude of the error signal 206 at a time t, and dt corresponds to a change in time t. Because the frequency 218 is known, the period (I) may be determined by dividing one (1) by the frequency 218. In a particular embodiment, the amplitude A may indicate a dynamic load allowable limit. The OFCM oscillatory failure amplitude threshold (D) may be determined using EQ-4 to detect all arbitrary waveforms of the error signal 206 that may carry an energy equal to or greater than the dynamic loads defined energy equivalent sinusoidal signal.

$$D = \frac{2}{\pi} \cdot A \quad \text{EQ-4}$$

In equation 4 (EQ-4), the OFCM oscillatory failure amplitude threshold D corresponds a 0-peak amplitude of the energy equivalent square waveform and A corresponds to the output derived using EQ-3 (i.e., a value of $A_{(0-p)}$). The OFCM oscillatory failure amplitude threshold D and the 0-peak amplitude A may be used to generate the OFCM detection monitor parameter 250 using the following equation:

$$\text{amplitude\_count\_to\_set\_latch} = \text{floor}\left(N_{on} \cdot \frac{2 \cdot \Delta t}{ts}\right) \quad \text{EQ-5}$$

$$= \text{floor}\left(\frac{N_{on}}{ts} \cdot \left(T - 4 \cdot \left|\frac{T}{2 \cdot \pi} \cdot \sin^{-1}\left(\frac{D}{A}\right)\right|\right)\right)$$

$$= \text{floor}\left(0.5607 \cdot \frac{N_{on} \cdot f_s}{f}\right)$$

In equation 5 (EQ-5), $N_{on}$ corresponds to the $N_{on}$ described with reference to the test sequencing management module 212, A corresponds to the output derived using EQ-3 (e.g., $A_{(0-p)}$), D corresponds to the output derived using EQ-4, ts corresponds to a sample rate (in seconds), and fs=1/ts. The output of EQ-5 (e.g., the amplitude_count_to_set_latch) may correspond to a threshold number of instances that the dynamic loads indicated by the error signal 206 may exceed a dynamic load threshold (i.e., a threshold number of failed oscillatory failure tests). The OFCM detection monitor parameters 250 may correspond to the output of EQ-3 and EQ-5 and may be provided to the oscillatory amplitude exceedence test module 222 for use in determining whether to set a flag indicating that the number of cycles of the error signal 206 covered by one OFCM test window has exceeded the dynamic loads amplitude limits. As can be seen in EQ-5, the output of EQ-5 may be determined based on a constant (e.g., 0.5607), the value of $N_{on}$, the frequency (f) (e.g., the frequency 218), and the value of ts. In a particular embodiment, the value of the constant, the value of $N_{on}$, and the value of is may be predetermined based on a particular design and configuration of a flight control computer (e.g., the flight control computer 102 of FIG. 1).

The persistence exceedence test management module 216 may be configured to receive the frequency 218 from the frequency calculation module 210 and to generate an OFCM detection monitor parameter 260. The persistence exceedence test management module 216 may be configured to generate the OFCM detection monitor parameter 260 based on the following equation:

$$\text{persistence\_count\_to\_set\_latch} = \frac{N_{loads}}{N_{on} + N_{off}} \quad \text{EQ-6}$$

In equation 6 (EQ-6), $N_{loads}$ corresponds to a maximum number of cycles permitted to exceed the allowable dynamic load indicated by the OFCM detection monitor parameter 250. $N_{on}$ and $N_{off}$ correspond to the $N_{on}$ and $N_{off}$ as described with reference to EQ-3. The persistence_count_to_set_latch value of EQ-6 may correspond to the number of OFCM test windows that are permitted to exceed the dynamic load threshold before a CLAW processing module (e.g., the CLAW processing module 116 of FIG. 1) is to be turned off. The *** persistence exceedence test management module 216 may be configured to provide the OFCM detection monitor parameter 260 indicating the number of cycles permitted to exceed the dynamic load threshold to the monitoring module 126 for use in generating the latched fault signal 140.

The monitoring module 126 may be configured to determine whether to disable the CLAW processing module 116. For example, the monitoring module 126 may receive the error signal 206, the enable signal 142, and the OFCM detection monitor parameters (e.g., the OFCM detection monitor parameters 240, 250, 260). Based on the error signal 206, the enable signal 142, and the OFCM detection monitor parameters 240, 250, 260, the monitoring module 126 may generate a latched fault signal 140. The latched fault signal 140 may be used to enable or disable the CLAW processing module 116.

As shown in FIG. 2, the monitoring module 126 includes a test sequencer module 220, an oscillatory amplitude exceedence test module 222, and an oscillatory failure persistence test module 224. The test sequencer module 220 may be configured to generate a synchronization signal 228 based on the OFCM detection monitor parameter 240, the latched fault signal 140, and the enable signal 142. In a particular embodiment, the enable signal 142 may be a flag that may be set to one of a first value (e.g., a one (1)) and a second value (e.g., a zero (0)). The monitoring module 126 may be turned on or off based on the enable signal 142 or the latched fault signal 140. For example, when the enable signal 142 is the second value (e.g., a zero (0)) or the latched fault signal 140 is one (1), the test sequencer module 220 may be turned off and may not generate the synchronization signal 228. When the enable signal 142 is the first value (e.g., a one (1)) and the latched fault signal 140 is a zero (0), the test sequencer module 220 may be turned on and may generate the synchronization signal 228. The test sequencer module 220 may generate the synchronization signal 228 during oscillatory failure monitoring (i.e., when the CLAW processing module 116 is turned on). An illustrative embodiment of logic configured to generate a synchronization signal (e.g., the synchronization signal 228) is described with reference to FIG. 5.

The monitoring module 126 may provide the synchronization signal 228 to the demodulation module 122 and the management module 124. The demodulation module 122 may provide the synchronization signal 228 to the signal generation module 202 for use in generating the error signal 206. The management module 124 may provide the synchronization signal 228 to the frequency calculation module 210 for use in determining the frequency 218. Illustrative embodiments of using the synchronization signal 228 to generate the error signal 206 and to determine the frequency 218 are described with reference to FIGS. 3 and 4.

The monitoring module 126 may be configured to provide the synchronization signal 228 from the test sequencer module 220 to the oscillatory amplitude exceedence test module 222. The oscillatory amplitude exceedence test module 222 may be configured to generate a failure pulsetrain 226 based on the synchronization signal 228, the error signal 206, and the OFCM detection monitor parameter 250. Each time the dynamic load experienced by the component(s) of the aircraft (e.g., the dynamic load indicated by the error signal 206) exceeds the dynamic load threshold (e.g., the dynamic load threshold indicated by the OFCM detection monitor parameter 250) during an amplitude exceedence window, the oscillatory amplitude exceedence test module 222 may be configured to generate a pulse on the failure pulsetrain 226. The oscillatory amplitude exceedence test module 222 may provide the failure pulsetrain 226 to the oscillatory failure persistence test module 224. An illustrative embodiment of logic configured to perform the functions of the oscillatory amplitude exceedence test module 222 is described with reference to FIG. 6.

The oscillatory failure persistence test module 224 may be configured to receive the failure pulsetrain 226 and the OFCM detection monitor parameter 260 from the persistence exceedence test management module 216. The oscillatory failure persistence test module 224 may generate the latched fault signal 140 based on the failure pulsetrain 226 and the OFCM detection monitor parameter 260. For example, the oscillatory failure persistence test module 224 may increment a counter each time a leading edge (e.g., a leading edge of the pulse) of the failure pulsetrain 226 is detected (e.g., each time the dynamic load test performed at the oscillatory amplitude exceedence test module 222 fails). The OFCM detection monitor parameter 260 may indicate a maximum number of offending cycles (e.g., the outcome of EQ-5) before the CLAW processing module 116 should be disabled (e.g., the latched fault signal 140 is set one (1)). When the counter value exceeds the maximum number of offending cycles indicated by the OFCM detection monitor parameter 260, the oscillatory failure persistence test module 224 may set the value of the latched fault signal 140 to one (1), causing the CLAW processing module 116 to be disabled.

The OFCM module 120 may eliminate or reduce the occurrence of nuisance trips because the OFCM module 120 is configured to account, in real-time or near real-time, for all dynamic loads experienced by the components of the aircraft that actually exceed the dynamic loads allowable limits. For example, as a result of generating the error signal 206 after the signal 130 is processed according to the one or more CLAWs (e.g., at the CLAW processing module 116), the OFCM module 120 is operable to account for the additional dynamic loads caused by the commands sent to the actuators 160 from the CLAW processing module 116 during dynamic loads exceedence testing.

Figure 3:
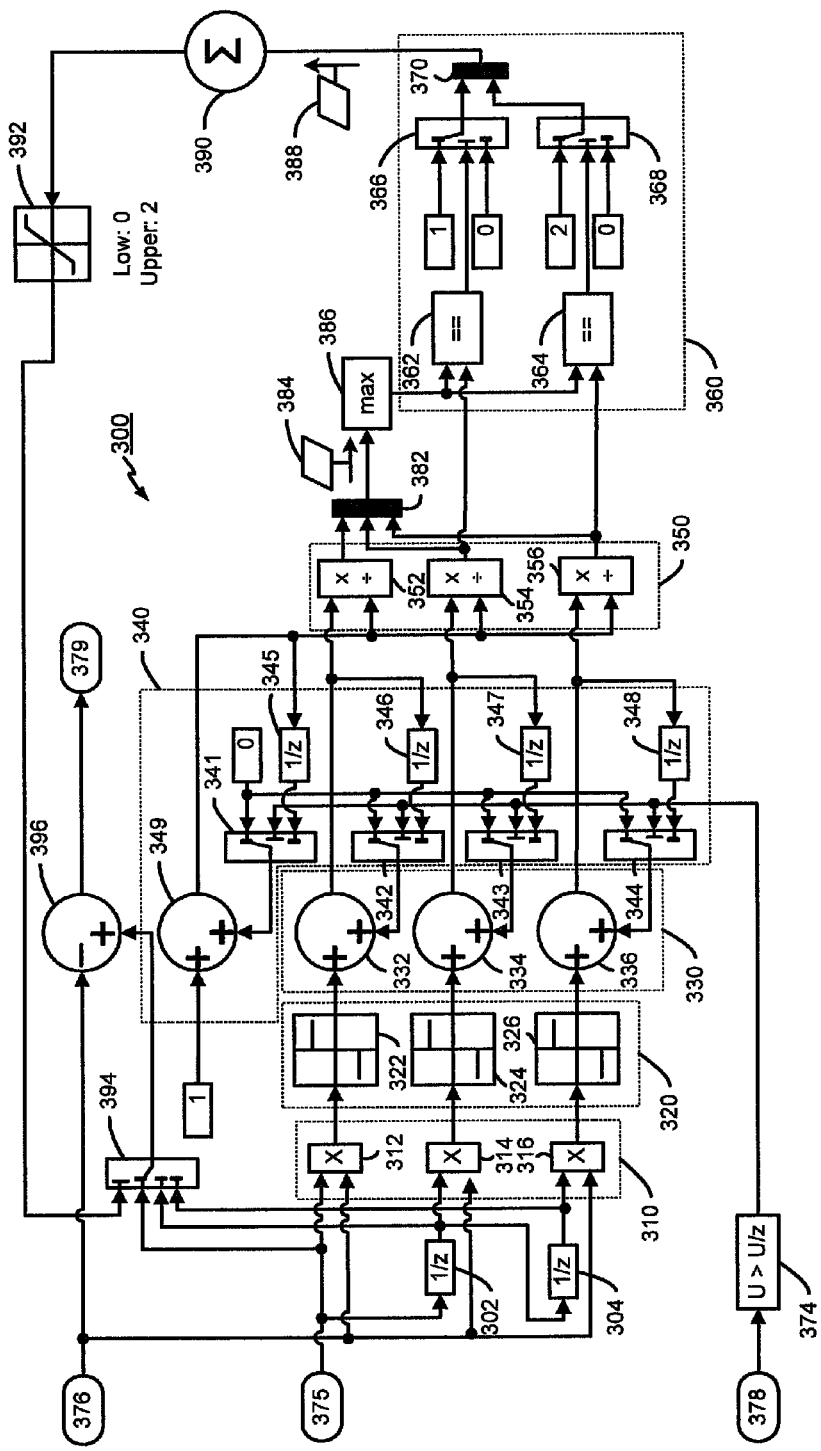
FIG. 3 is an illustrative embodiment of signal generation logic configured to generate an error signal.

Referring to FIG. 3, an illustrative embodiment of signal generation logic 300 configured to generate an error signal is shown. FIG. 3 is merely illustrative of one possible implementation of the signal generation logic 300. In other embodiments, different logic configured perform the operations of the signal generation logic 300 may be used. In an embodiment, the signal generation logic 300 corresponds to or is included within the signal calculation module 210 of FIG. 2. In an embodiment, the signal generation logic 300 may be implemented as instructions stored on a computer-readable medium (e.g., a hard disk drive, a memory). The instructions may be executable by a processor to perform the various functions described with reference to FIG. 3. In an additional or alternative embodiment, the signal generation logic 300 may be implemented as circuitry configured to perform the various functions described with reference FIG. 3. The circuitry may include a field-programmable gate array (FPGA) device, an application-specific integrated circuit (ASIC), a processing unit such as a central processing unit (CPU), a controller, a firmware device, or another hardware device configured to perform the various functions described with reference to FIG. 3.

As shown in FIG. 3, the signal generation logic 300 includes first delay logic 302, second delay logic 304, a first processing block 310, a second processing block 320, a third processing block 330, a fourth processing block 340, a fifth processing block 350, signal detection logic 374, a sixth processing block 360, first data processing logic 382, max determination logic 386, summation logic 390, a limiter 392, switch 394, and subtraction logic 396. The first processing block 310 includes a first multiplication block 312, a second multiplication block 314, and a third multiplication block 316. The second processing block 320 includes first sign logic 322, second sign logic 324, and third sign logic 326. The third processing block 330 includes first summation logic 332, second summation logic 334, and third summation logic 336. The fourth processing block 340 includes a first switch 341, a second switch 342, a third switch 343, a fourth switch 344, third delay logic 345, fourth delay logic 346, fifth delay logic 347, sixth delay logic 348, and summation logic 349. The fifth processing block 350 includes first division logic 352, second division logic 354, and third division logic 356. The sixth processing block 360 includes a first comparator 362, a second comparator 364, a first output switch 366, a second output switch 368, and second data processing logic 370.

The signal generation logic 300 may receive a first signal 375 and a second signal 376. In a particular embodiment, the first signal 375 corresponds to the signal 136 of FIGS. 1 and 2 (i.e., the signal 130 after being processed at the signal processing module 112 and the CLAW processing module 116 of FIG. 2), and the second signal 376 corresponds to the signal 138 (e.g., the signal 132 after being processed at the CLAW processing module 116 of FIG. 1). The signal generation logic 300 may be configured to generate a signal 379 based on a phase difference of the first signal 375 relative to the second signal 376. In an embodiment, the signal 379 corresponds to the signal 206 of FIG. 2 (e.g., the output of the demodulation module 122 of FIGS. 1 and 2).

To illustrate, the signal generation logic 300 may receive the first signal 375 and the second signal 376. The first signal 375 may be provided to the first delay logic 302 and to the first multiplication block 312. The first delay logic 302 may apply a first delay to the signal 375 to generate a first delayed signal. The first delayed signal may be provided from the first delay logic 302 to the second delay logic 304 and to the second multiplication block 314. The second delay logic 304 may apply a second delay to the first delayed signal to generate a second delayed signal. The second delayed signal may be provided from the second delay logic 304 to the third multiplication block 316.

In a particular embodiment, the first delay logic 302 and the second delay logic 304 may apply a same amount of delay (e.g., the first delayed signal is delayed relative to the signal 375 by the same amount of delay as the second delayed signal is delayed relative to the first delayed signal). To illustrate, assume that the first delay logic 302 and the second delay logic 304 each apply a one-tenth of a second (0.1 seconds) delay to an input signal. When the signal 375 is received at the first delay logic 302, the first delay logic 302 applies the one-tenth of a second (0.1 seconds) delay to the signal 375 to generate the first delayed signal. The first delayed signal is representative of the signal 375 delayed by one-tenth of a second (0.1 seconds). When the first delayed signal is received at the second delay logic 304 from the first delay logic 302, the second delay logic 304 applies the one-tenth of a second (0.1 seconds) delay to the first delayed signal to generate the second delayed signal. Thus, the second delayed signal is representative of the signal 375 delayed by two-tenths of a second (0.2 seconds). The two-tenths of a second delay corresponds to the one-tenth of a second (0.1 seconds) delay introduced by the first delay logic 302 and the one-tenth of a second (0.1 seconds) delay introduced by the second delay logic 304. The amount of delay applied by the first delay logic 302 and the second delay logic 304 may be less than or greater than one-tenth of a second (0.1 seconds). In another embodiment, the first delay logic 302 and the second delay logic 304 may apply different amounts of delay to the signal 375.

The signal 376 may be provided to the first processing block 310 along with the signal 375, the first delayed signal, and the second delayed signal. For example, the signal 375 and the signal 376 may be provided to the first multiplication block 312. The first delayed signal (e.g., the signal 375 delayed by the first delay logic 302) and the signal 376 may be provided to the second multiplication block 314, and the second delayed signal (e.g., the signal 375 delayed by the first delay logic 302 and the second delay logic 304) and the signal 376 may be provided to the third multiplication block 316. The two input signals received by each of the multiplication blocks 312, 314, 316 may be multiplied to produce an output signal.

The output signals generated by the multiplication blocks 312, 314, 316 may be provided to the second processing block 320. For example, the output signal generated by the first multiplication block 312 may be provided to the first sign logic 322, the output signal generated by the second multiplication block 314 may be provided to the second sign logic 324, and the output signal generated by the third multiplication block 316 may be provided to the third sign logic 326. The first sign logic 322, the second sign logic 324, and the third sign logic 326 may be configured to generate numeric values corresponding to the output signals received from the multiplication blocks 312, 314, 316. For example, the first sign logic 322 may receive the output signal from the first multiplication block 312 and generate a first numeric value associated with the output signal received from the first multiplication block 312, the second sign logic 324 may receive the output signal generated by the second multiplication block 314 and generate a second numeric value associated with the output signal received from the second multiplication block 314, and the third sign logic 326 may receive the output signal generated by the third multiplication block 316 and generate a third numeric value associated with the output signal received from the third multiplication block 316. The numeric values generated by the first sign logic 322, second sign logic 324, third sign logic 326 may be provided to the third processing block 330. In a particular embodiment, the numeric values generated by the first sign logic 322, second sign logic 324, third sign logic 326 may be one of a positive one (+1), a zero (0), and a negative one (−1). The numeric values correspond to a sign of the signal output from each of the multiplication blocks 312, 314, 316.

As shown in FIG. 3, each of the first summation logic 332, the second summation logic 334, and the third summation logic 336 may receive the numeric value generated by a corresponding one of the first sign logic 322, the second sign logic 324, and the third sign logic 326 as a first input and provide the numeric value to the fourth processing block 340. The fourth processing block 340 may receive the numeric values from the first summation logic 332, the second summation logic 334, and the third summation logic 336, and, in response to a control signal generated by the signal detection logic 374, the fourth processing block 340 may provide additional input values to the first summation logic 332, the second summation logic 334, and the third summation logic 336.

For example, the signal detection logic 374 may be configured to detect a change in a value of the signal 378 and to generate a control signal that is provided to each of the switches 341, 342, 343, 344 during a first test of a sample signal (e.g., a first frame of the signal 375). At startup, each of the switches 341, 342, 343, 344 may be configured in a first state and provide a zero (0) value as an output. The outputs (e.g., the zero (0) values) may be provided to the first summation logic 332, second summation logic 334, third summation logic 336 as additional inputs and may be added to the inputs received at the first summation logic 332, the second summation logic 334, and the third summation logic 336 from the first sign logic 322, the second sign logic 324, and the third sign logic 326. The sum of the inputs from the first sign logic 322, second sign logic 324, third sign logic 326 and the additional inputs of the switches 342, 343, 344 may be received at the logic blocks 346, 347, 348. The summation logic 349 may receive a first input (e.g., a one (1)) and a second input from the first switch 341 (e.g., a zero (0) during the first test of the sample signal). The sum of the first input of the summation logic 349 and the second input of the summation logic 349 may be provided to the third delay logic 345.

During a second test of a sample signal (e.g., a second frame of the signal 375), the signal detection logic 374 may generate a second control signal in response to detecting a change in the value of the signal 378. The second control signal may be provided to each of the switches 341, 342, 343, 344. In response to the second control signal, each of the switches 341, 342, 343, 344 may be latched to the outputs of the delay logic blocks 345, 346, 347, 348, respectively, and may provide the values from the delay logic blocks 345, 346, 347, 348 to the corresponding one of the first summation logic 332, the second summation logic 334, the third summation logic 336, and the summation logic 349. The values received at the delay logic blocks 345, 346, 347, 348 from the first summation logic 332, the second summation logic 334, the third summation logic 336, and the summation logic 349 correspond to the sum determined at the first summation logic 332, the second summation logic 334, the third summation logic 336, and the summation logic 349 based on the previous sample (e.g., the first sample) of the signal (e.g., the first frame of the signal 375). Thus, the first summation logic 332, the second summation logic 334, the third summation logic 336, and the summation logic 349 are configured to sum values during testing of samples of the signal 375 over a period of time (e.g., an amplitude exceedence test window). The sum determined at the summation logic 349 corresponds to a number of frames sampled and the sums determined at each of the first summation logic 332, the second summation logic 334, and the third summation logic 336 correspond to the sums of the numeric values generated by the first sign logic 322, second sign logic 324, third sign logic 326 for each of the signals 375 (e.g., the non-delayed signal 375, the signal 375 delayed by the first delay logic 302, and the signal 375 delayed by both the first delay logic 302 and the second delay logic 304).

The outputs of the first summation logic 332, the second summation logic 334, and the third summation logic 336 (e.g., the sums determined based on the inputs received from the first sign logic 322, the second sign logic 324, the third sign logic 326, and the delay logic blocks 346, 347, 348) may be provided, with the sum determined by the summation logic 349, to the fifth processing block 350. The division logic blocks 352, 354, 356 included in the fifth processing block 350 may be configured to divide each of the outputs of the first summation logic 332, the second summation logic 334, and the third summation logic 336 by the output of the summation logic 349 to generate an average numeric value for each of the sampled signals (e.g., the non-delayed signal 375, the signal 375 delayed by the first delay logic 302, and the signal 375 delayed by both the first delay logic 302 and the second delay logic 304). As described with reference to FIG. 2, when a particular delayed signal (e.g., the signal 375, the signal delayed by the first delay logic 302, or the signal delayed by the first delay logic 302 and the second delay logic 304) is in synch with the signal 376, the sum of the numeric values (e.g., the sum determined at one of the first summation logic 332, the second summation logic 334, or the third summation logic 336 corresponding to the particular delayed signal) will be greater than when the particular signal and the signal 376 are out of synch.

The outputs of the fifth processing block 350 may be provided to the first data processing logic 382. The first data processing logic 382 may be configured to generate a vector 384 including each of the average values determined at the division logic blocks 352, 354, 356 and to provide the vector 384 to max determination logic 386. The max determination logic 386 may be configured to determine a maximum average value based on the average values included in the vector 384. The max determination logic 386 may provide the maximum average value to the sixth processing block 360.

The sixth processing block 360 may be configured to receive the maximum average value from the max determination logic 386 and the average numeric values generated at the division logic 354 and the division logic 356. The sixth processing block 360 may be configured to determine whether the signal 375 or one of the delayed signals 375 (e.g., the signal 375 delayed by the first delay logic 302 and the signal 375 delayed by the second delay logic 304) is in synch with the signal 376 based on the maximum average value and the average numeric values received from the division logic 354 and the division logic 356.

For example, the numeric value determined by the division logic 354 may be provided to a first comparator 362 and compared to the maximum average value determined at the max determination logic 386. When the comparison indicates that the maximum average value is equal to the numeric value determined by the division logic 354, the first comparator 362 may generate a first signal causing the first output switch 366 to provide a first output (e.g., a one (1)) to the second data processing logic 370. When the comparison indicates that the maximum average value is not equal to the numeric value determined by the division logic 354, the first comparator 362 may generate a second signal causing the first output switch 366 to provide a second output (e.g., a zero (0)) to the second data processing logic 370. The numeric value determined by the division logic 356 may be provided to the second comparator 364 and compared to the maximum average value determined at the max determination logic 386. When the comparison indicates that the maximum average value is equal to the numeric value determined by the division logic 356, the second comparator 364 may generate a first signal causing the second output switch 368 to provide a first output (e.g., a two (2)) to the second data processing logic 370. When the comparison indicates that the maximum average value is not equal to the numeric value determined by the division logic 356, the second comparator 364 may generate a second signal causing the second output switch 368 to provide a second output (e.g., a zero (0)) to the second data processing logic 370.

The second data processing logic 370 may generate a second vector 388 that includes the values output by the output switches 366, 368. The second vector 388 may be received at summation logic 390 where the two values included in the second vector 388 are added together to form an output that is provided to the limiter 392. The limiter 392 may be configured to bound the value received from the summation logic 390 between an upper threshold (e.g., two (2)) and a lower threshold (e.g., zero (0)). In a particular embodiment, the upper and lower thresholds may be determined based on a number of signals processed by the signal generation logic 300. For example, in FIG. 3, three (3) signals are processed by the signal generation logic 300. The first signal corresponds to the signal 375 with zero (0) delay, the second signal corresponds to the signal 375 with the first delay (e.g., the delay applied by the first delay logic 302), and the third signal corresponds to the signal 375 with the second delay (e.g., the delay applied by the second delay logic 304). The output (e.g., the bounded value) of the limiter 392 may indicate which of the delayed signals (e.g., the first delayed signal, the second delayed signal, or the third delayed signal) is to be used to generate the error signal 379.

To illustrate, the output of the limiter 392 may be provided as a control input to the switch 394. The switch 394 may be configured to provide one of the first delayed signal (e.g., the signal 375), the second delayed signal (e.g., the signal 375 delayed by the first delay logic 302), and the third delayed signal (e.g., the signal 375 delayed by the first delay logic 302 and the second delay logic 304) to the subtraction logic 396. The subtraction logic 396 may subtract the signal 376 from the signal received from the switch 394 to generate an error signal 379. In a particular embodiment, the error signal 379 corresponds to the error signal 206 of FIG. 2.

Thus, the signal generation logic 300 is configured to receive a first signal and a second signal and generate an error signal based on a difference between the first signal and the second signal. Further, the signal generation logic 300 is configured to determine an amount of delay to apply to the first signal to synchronize the first signal with the second signal prior to determining the difference between the first signal and the second signal.

Figure 4:
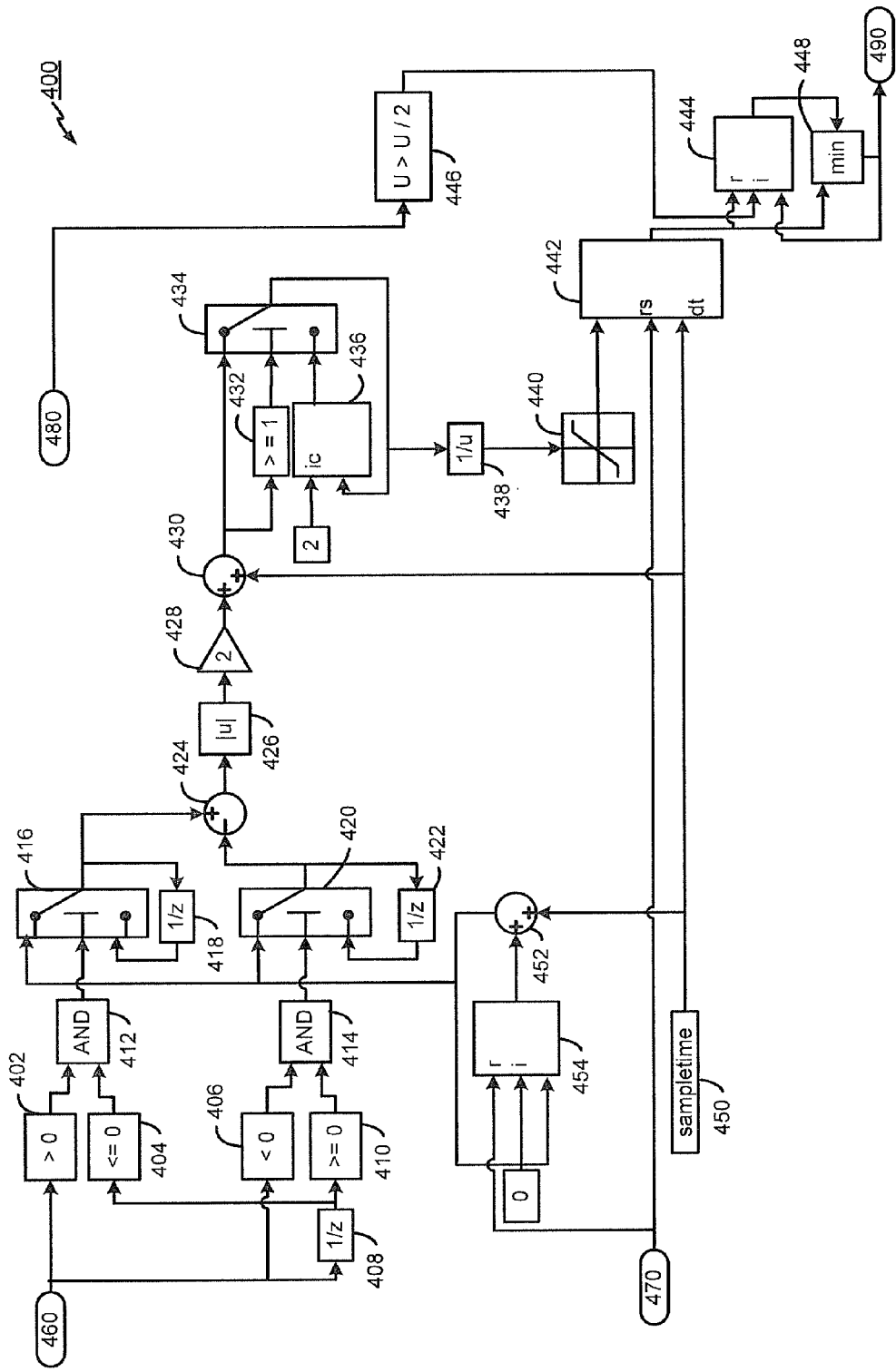
FIG. 4 is an illustrative embodiment of logic configured to determine a frequency of an error signal using a zero crossing method.

Referring to FIG. 4, an illustrative embodiment of logic 400 configured to determine a frequency of an error signal using a zero crossing method is shown. FIG. 4 is merely illustrative of one possible implementation of the logic 400. In other embodiments, different logic configured perform the operations of the logic 400 may be used. In an embodiment, the logic 400 may correspond to or is included within the frequency calculation module 210 of FIG. 2. In an embodiment, the logic 400 may be implemented as instructions stored on a computer-readable medium (e.g., a hard disk drive, a memory). The instructions may be executable by a processor to perform the various functions described with reference to FIG. 4. In an additional or alternative embodiment, the logic 400 may be implemented as circuitry configured to perform the various functions described with reference FIG. 4. The circuitry may include a field-programmable gate array (FPGA) device, an application-specific integrated circuit (ASIC), a processing unit such as a central processing unit (CPU), a controller, a firmware device, or another hardware device configured to perform the various functions described with reference to FIG. 4.

As shown in FIG. 4, the logic 400 includes first comparison logic 402, second comparison logic 404, third comparison logic 406, first delay logic 408, fourth comparison logic 410, a first logical AND block 412, a second logical AND block 414, a first switch 416, second delay logic 418, a second switch 420, third delay logic 422, difference logic 424, an absolute value logic block 426, a multiplier 428, sum logic 430, fifth comparison logic 432, a third switch 434, first processing logic 436, frequency determination logic 438, a limiter 440, second processing logic 442, third processing logic 444, a signal detector 446, minimum frequency determination logic 448, second sum logic 452, and fourth processing logic 454. The logic 400 may receive a first signal 450, a second signal 460, a third signal 470, and a fourth signal 480 as inputs and generate an output signal 490. In a particular embodiment, the second signal 460 may correspond to the error signal 206 of FIG. 2 or the error signal 379 of FIG. 3. In an embodiment, the fourth signal 480 may correspond to the synchronization signal 228 of FIG. 2.

The logic 400 may be configured to determine the frequency of the second signal 460 using a zero crossing method. For example, the output of the first logical AND block 412 may be a first value (e.g., a one (1)) when a previous frame (e.g., previous sample of the second signal 460) is less than or equal to zero (0) and a current frame (e.g., a current sample of the second signal 460) is greater than zero (0). The output of the second logical AND block 414 may be a first value (e.g., a one (1)) when the previous frame is greater than or equal to zero (0) and the current frame is less than zero (0). The outputs of the first logical AND block 412 and the second logical AND block 414 may both be a second value (e.g., a zero (0)) when the previous frame and the current frame have a same sign (i.e., the previous frame and the current frame indicate the second signal 460 is on the same side of zero (0)). Additionally, the output of the first logical AND block 412 may have the second value (e.g., the zero (0)) when the output of the second logical AND block 414 has the first value (e.g., the one (1)). The output of the second logical AND block 414 may have the second value (e.g., the zero (0)) when the output of the second logical AND block 412 has the first value (e.g., the one (1)).

As shown in FIG. 4, the logic 400 may be configured to receive the second signal 460 and to provide the second signal 460 to the first comparison logic 402, the third comparison logic 406, and the first delay logic 408. The first delay logic 408 may apply a one (I) frame delay to the second signal 460 and provide a delayed second signal to the second comparison logic 404 and the fourth comparison logic 410. The first comparison logic 402 may be configured to determine whether the second signal is greater than zero (0), and the second comparison logic 404 may be configured to determine whether the delayed second signal (e.g., the previous frame of the second signal 460) is less than or equal to zero (0).

When the second signal 460 is greater than zero (0), the first comparison logic 402 may provide a first value (e.g., one (1) or true) to the first logical AND block 412. When the second signal 460 is less than or equal zero (0), the first comparison logic 402 may provide a second value (e.g., zero (0) or false) to the first logical AND block 412. The third comparison logic 406 may be configured to determine whether the second signal 460 is less than zero (0) and the fourth comparison logic 410 may be configured to determine whether the delayed second signal (e.g., the previous frame of the second signal 460) is greater than or equal to zero (0). When the second signal 460 is less than zero (0), the third comparison logic 406 may provide a first value (e.g., one (1) or true) to the second logical AND block 414. When the second signal 460 is greater than or equal to zero (0), the third comparison logic 406 may provide a second value (e.g., zero (0) or false) to the second logical AND block 414. When the delayed second signal is greater than or equal zero (0), the fourth comparison logic 410 may provide a first value (e.g., one (1) or true) to the second logical AND block 414. When the delayed second signal is less than zero (0), the fourth comparison logic 410 may provide a second value (e.g., zero (0) or false) to the second logical AND block 414.

The first logical AND block 412 may be configured to perform a logical AND operation on its inputs (e.g., the outputs of the first comparison logic 402 and the second comparison logic 404) to generate a first control signal. The first control signal may be provided from the first logical AND block 412 to the first switch 416 and the second control signal may be provided from the second logical AND block 414 to the second switch 420. The first control signal and the second control signal may be used to control a first output signal of the first switch 416 and to control a second output signal of the second switch 420. When the output of the first logical AND block 412 has a first value (e.g., one (1) or true), the first switch 416 may be latched to an output of the second sum logic 452. The output of the second sum logic 452 may correspond to a clock signal and may be used by the logic 400 as a time reference. When the output of the first logical AND block 412 has a second value (e.g., zero (0) or false), the first switch 416 may be latched to an output of the second delay logic 418. The output of the second delay logic 418 may correspond to a first timestamp. When the output of the second logical AND block 414 has a first value (e.g., one (1) or true), the second switch 420 may be latched to the output of the second sum logic 452 (e.g., the clock signal). When the output of the second logical AND block 414 has a second value (e.g., zero (0) or false), the second switch 420 may be latched to an output of the third delay logic 422. The output of the third delay logic 422 may correspond to a second timestamp. The difference logic 424 may be configured to determine a difference between the output of the first switch 416 and the output of the second switch 420. The difference between the output of the first switch 416 and the output of the second switch 420 corresponds to one-half of a period of the second signal 460.

To illustrate, assume that the second signal 460 corresponds to a sinusoidal waveform. At a first time ($t_1$), the output of the first logical AND block 412 may be a first value (e.g., zero (0) or false) and the output of the second logical AND block 414 may be a second value (e.g., one (1) or true), and the output of the second sum logic 452 may correspond to a first timestamp ($TS_1$) of the first time ($t_1$). At the first time ($t_1$), the first switch 416 may remain latched to the output of the second sum logic 452 and may provide an output corresponding to the first timestamp ($TS_1$). Additionally, the second switch 420 may become latched to the output of the third delay logic 422. Thus, the output of the second switch 420 may correspond to the output of the second sum logic 452. As shown in FIG. 4, the output of the second switch 420 is provided as the input to the third delay logic 422. Thus, at the first time ($t_1$), the second switch 420 may provide an output corresponding to the first timestamp ($TS_1$) stored at the third delay logic 422. At the first time ($t_1$), the output of the difference logic 424 may be zero (0) because the outputs of both the first switch 416 and the second switch 420 correspond to the first timestamp (e.g., $TS_1$).

At a subsequent time ($t_2$), the output of the first logical AND block 412 may be a second value (e.g., e.g., one (1) or true) and the output of the second sum logic 452 may correspond to a second timestamp ($TS_2$). At the second time ($t_2$), the first switch 416 may become latched to the output of the second delay logic 418 and may provide an output corresponding to the first timestamp ($TS_1$), and the second switch 420 may become latched to the output of the second sum logic 452. At the second time ($t_2$), the output of the second sum logic 452 may correspond to a second timestamp ($TS_2$). Thus, at the second time ($t_2$), the output of the second switch 420 may correspond to the second timestamp ($TS_2$), and the output of the difference logic 424 may correspond to a difference between the first timestamp ($TS_1$) received from the first switch 416 and the second timestamp ($TS_2$) received from the second switch 420. The difference may correspond to one-half of a period of the second signal 460.

The absolute value logic block 426 may be configured to receive the output (e.g., the one-half of the period of second signal 460) from the difference logic 424 and to generate an output corresponding to an absolute value of the output received from the difference logic 424. The absolute value logic block 426 may be configured to provide the output (e.g., the absolute value of the output received from the difference logic 424) to the multiplier 428. The multiplier 428 may be configured to determine the full period of the second signal 460 by multiplying the output of the absolute value logic block 426 by two (2). The multiplier 428 may be configured to provide the period to the sum logic 430.

The sum logic 430 may be configured to add the output of the multiplier 428 and the first signal 450 to generate an output. The output of the sum logic 430 may be provided to the fifth comparison logic 432 and the third switch 434. The output of the sum logic 430 that is provided to the fifth comparison logic 432 may control the output of the third switch 434. As shown in FIG. 4, the third switch 434 receives a second input from the first processing logic 436. The first processing logic 436 may be configured to provide default values upon initialization of the logic 400. For example, at the first time ($t_1$), the output of the difference logic 424 may initially be zero, causing the outputs of the absolute value logic block 426, the multiplier 428, and the sum logic 430 to be zero. When the outputs of the absolute value logic block 426, the multiplier 428, and the sum logic 430 are zero, the third switch 434 is latched to the output of the first processing logic 436. The first processing logic 436 is configured to provide a default value (e.g., 2) to the third switch 434 which is then provided as the input to the frequency determination logic 438. At the second time ($t_2$), the output of the sum logic 430 is greater than zero (0) and the third switch 434 is configured to provide the output of the sum logic 430 (e.g., the full period of the second signal 460) as the input to the frequency determination logic 438. The frequency determination logic 438 may be configured to determine the frequency (f) of the second signal 460 by dividing one (1) by the output of the third switch 434 (e.g., by the full period of the second signal 460).

The output of the frequency determination logic 438 corresponds to the frequency (f) of the second signal 460 in hertz (Hz). The frequency determination logic 438 may be configured to provide the frequency (f) to the limiter 440. The limiter 440 may be configured to bound the frequency (f) between a first frequency threshold and a second frequency threshold. In a particular embodiment, the first frequency threshold corresponds to a lower bound of the frequency (f) and may have a value of 0.2 Hz and the second frequency threshold corresponds to an upper bound of the frequency (n and may have a value of 1.0 Hz.

The bounded frequency (f) may be provided from the limiter 440 to a second processing logic 442. The second processing logic 442 may correspond to a low pass filter and may use a time constant (e.g., approximately thirty (30) seconds) to smooth the frequency. The second processing logic 442 may also receive the third signal 470 and the signal first signal 450 as inputs. The third signal 470 may be used to reset the second processing logic 442 at the start of each detection cycle (e.g., each time the logic 400 is turned on). The filtered frequency (f) may be provided from the second processing logic 442 to the third processing logic 444.

The third processing logic 444 may be configured to provide the filtered frequency (f) to the minimum frequency determination logic 448. The third processing logic 444 may be responsive to the output of the signal detector 446 to determine whether to provide the frequency (f) received from the third processing logic 444 to the minimum frequency determination logic 448 or to provide a default frequency value to the minimum frequency determination logic 448. To illustrate, the signal detector 446 may be configured to detect a leading edge of the fourth signal 480. In a particular embodiment, the fourth signal 480 corresponds to the synchronization signal 228 of FIG. 2. When the leading edge of the fourth signal 480 is detected, the signal detector 446 may output a first value (e.g., a one (1)). When the leading edge of the fourth signal 480 is not detected, the signal detector 446 may output a second value (e.g., a zero (0)). When the output of the signal detector 446 corresponds to the first value, the filtered frequency (f) received at the third processing logic 444 from the second processing logic 442 is provided to the minimum frequency determination logic 448.

Upon initialization of the logic 400, the third processing logic 444 may be configured to provide a default frequency value until the filtered frequency (f) is received from the second processing logic 442. For example, when the first leading edge of the fourth signal 480 is detected at the signal detector 446, the filtered frequency (f) may not be received at the third processing logic 444 from the second processing logic 442. Thus, the default frequency value may be provided to the minimum frequency determination logic 448. After receiving the filtered frequency (f) at the third processing logic 444 from the second processing logic 442, when the leading edge of the fourth signal 480 is detected at the signal detector 446, the third processing logic 444 may provide the filtered frequency (f) to the minimum frequency determination logic 448, rather than the default frequency value. The minimum frequency determination logic 448 may generate the output signal 490 indicating the minimum frequency (f) of the second signal 460 (e.g., with harmonic frequencies removed) and may also provide the minimum frequency (f) to the third processing logic 444. Thus, the logic 400 may be configured to determine a frequency of a signal (e.g., the second signal 460) using a zero crossing method and to generate a signal (e.g., the output signal 490) indicating the determined frequency of the signal.

Figure 5:
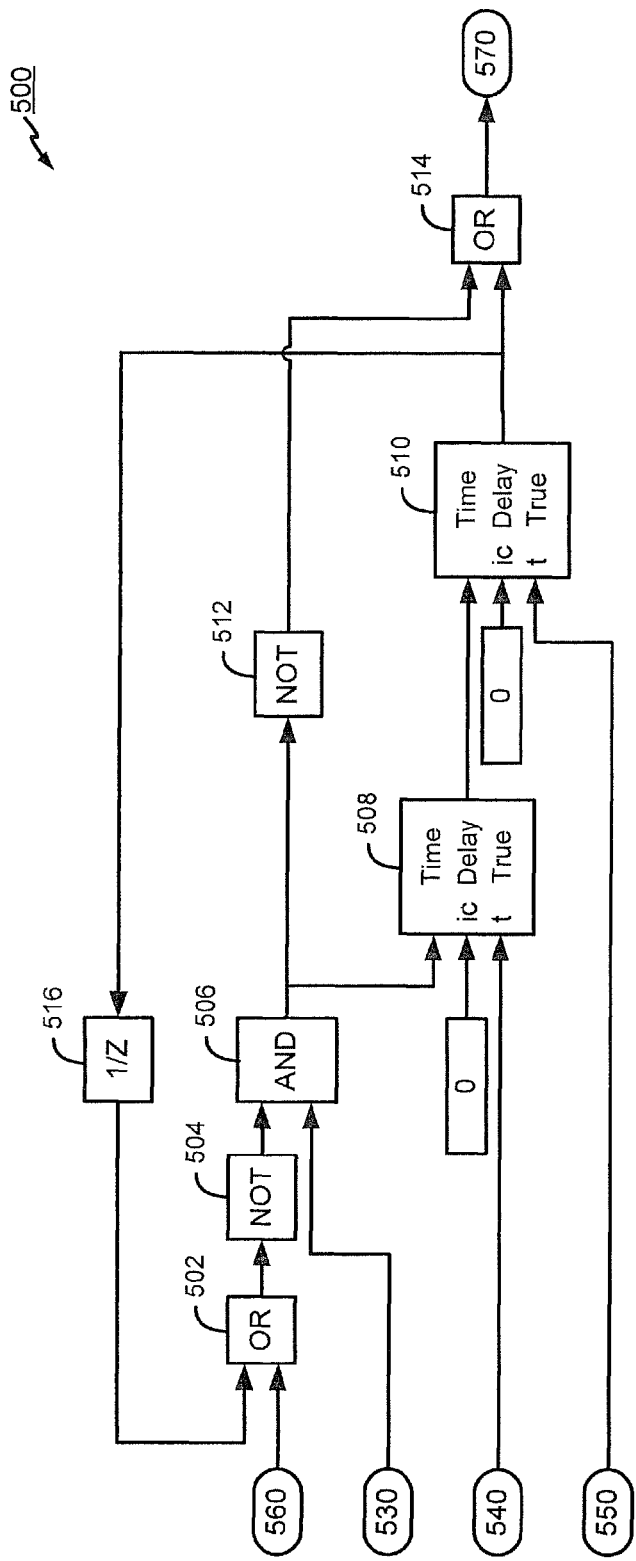
FIG. 5 is an illustrative embodiment of logic configured to generate a test synchronization signal.

Referring to FIG. 5, an illustrative embodiment of logic 500 configured to generate a test synchronization signal 570 is shown. In a particular embodiment, the test synchronization signal 570 corresponds to the synchronization signal 228 described with reference to FIG. 2. As shown in FIG. 5, the logic 500 includes a first logic block 502, a second logic block 504, a third logic block 506, a fourth logic block 508, a fifth logic block 510, a sixth logic block 512, a seventh logic block 514, and an eighth logic block 516. FIG. 5 is merely illustrative of one possible implementation of the logic 500. In other embodiments, different logic configured perform the operations of the logic 500 may be used. In an embodiment, the logic 500 may correspond to or is included within the test sequencer module 220 of FIG. 2. In an embodiment, the logic 500 may be implemented as instructions stored on a computer-readable medium (e.g., a hard disk drive, a memory). The instructions may be executable by a processor to perform the various functions described with reference to FIGS. 2 and 5. In an additional or alternative embodiment, the logic 500 may be implemented as circuitry configured to perform the various functions described with reference FIGS. 2 and 5. The circuitry may include a field-programmable gate array (FPGA) device, an application-specific integrated circuit (ASIC), a processing unit such as a central processing unit (CPU), a controller, a firmware device, or another hardware device configured to perform the various functions described with reference to FIGS. 2 and 5. During operation, the logic 500 may receive inputs including a first signal 530, a second signal 540, a third signal 550, and a fourth signal 560. In a particular embodiment, the first signal 530 may be an enable signal, such as the enable signal 142 of FIGS. 1 and 2 and may be received at the logic 500 from a CLAW processing module (e.g., the CLAW processing module 116 of FIG. 1). For example, the first signal 530 may have a first value (e.g., a one (1)) when the CLAW processing module is turned on and may have a second value (e.g., a zero (0)) when the CLAW processing module is turned off. In a particular embodiment, the second signal 540 and the third signal 550 may correspond to an OFCM detection monitor parameter (e.g., the OFCM detection monitor parameter 240) generated by a management module (e.g., the management module 124 of FIGS. 1 and 2). For example, the second signal 540 may correspond to $T_{on}$, and the third signal 550 may correspond to $T_{off}$, as described with reference to FIG. 2. In a particular embodiment, the fourth signal 560 may correspond to latched fault signal 140 of FIGS. 1 and 2.

The first signal 530 may cause the logic 500 to initiate testing and to generate a synchronization signal (e.g., the synchronization signal 228 of FIGS. 1 and 2). For example, the fourth signal 560 (e.g., the latched fault signal 140 of FIGS. 1 and 2) may be provided to the first logic block 502. The first logic block 502 may perform a logical OR operation on the fourth signal 560 and the output of the 516. The output of the eighth logic block 516 may correspond to an output of the fifth logic block 510 that has been delayed. The output of the fifth logic block 510 may be a first value (e.g., a one (1)) or a second value (e.g., a zero (0)). The output of the fifth logic block 510 may be provided to the seventh logic block 514.

The seventh logic block 514 may be configured to perform a logical OR operation on the output of the fifth logic block 510 and an output of the sixth logic block 512 to generate the test synchronization signal 570. The sixth logic block 512 may be configured to perform a logical NOT operation on an output of the third logic block 506. The third logic block 506 may be configured to perform a logical AND operation on the first signal 530 and the output of the second logic block 504. The output of the third logic block 506 may be a first value (e.g., a one (1)) or a second value (e.g., a zero (0)). The second logic block 504 may perform a logical NOT operation on the output of the first logic block 502. The output of the first logic block 502 may be a first value (e.g., a one (1)) or a second value (e.g., a zero (0)).

The output of the third logic block 506 may also be provided to the fourth logic block 508. The fourth logic block 508 may be configured to receive the second signal 540 and to generate an output that is provided to the fifth logic block 510. The second signal 540 may correspond to an amount of time (e.g., $T_{on}$) during which samples of an error signal (e.g., the error signal 206 of FIG. 2) are monitored by an oscillatory failure monitor (OFCM) module (e.g., the OFCM module 120 of FIGS. 1 and 2). The output of the 508 may be determined based on the output of the 506.

For example, when the output of the third logic block 506 is the second value (e.g., the zero (0)), the output of the fourth logic block 508 may be zero (0). When the output of the third logic block 506 is the first value (e.g., the one (1)), the output of the fourth logic block 508 may correspond be a one (1) that is delayed by the amount of time indicated by the second signal 540. The fifth logic block 510 may receive the third signal 550 and an output of the fourth logic block 508 as inputs. The output of the fifth logic block 510 may be determined based on the output of the fourth logic block 508. The third signal 550 may correspond to an amount of time (e.g., $T_{off}$) during which samples of the error signal (e.g., the error signal 206 of FIG. 2) are not to be monitored by the OFCM module (e.g., the OFCM module 120 of FIGS. 1 and 2). For example, when the output of the fourth logic block 508 is zero (0), the output of the fifth logic block 510 may be a zero (0) that is delayed by the amount of time indicated by the third signal 550. When the output of the fourth logic block 508 is one (1), the output of the fourth logic block 508 passes through the fifth logic block 510 without delay and is provided to the seventh logic block 514.

Figure 6:
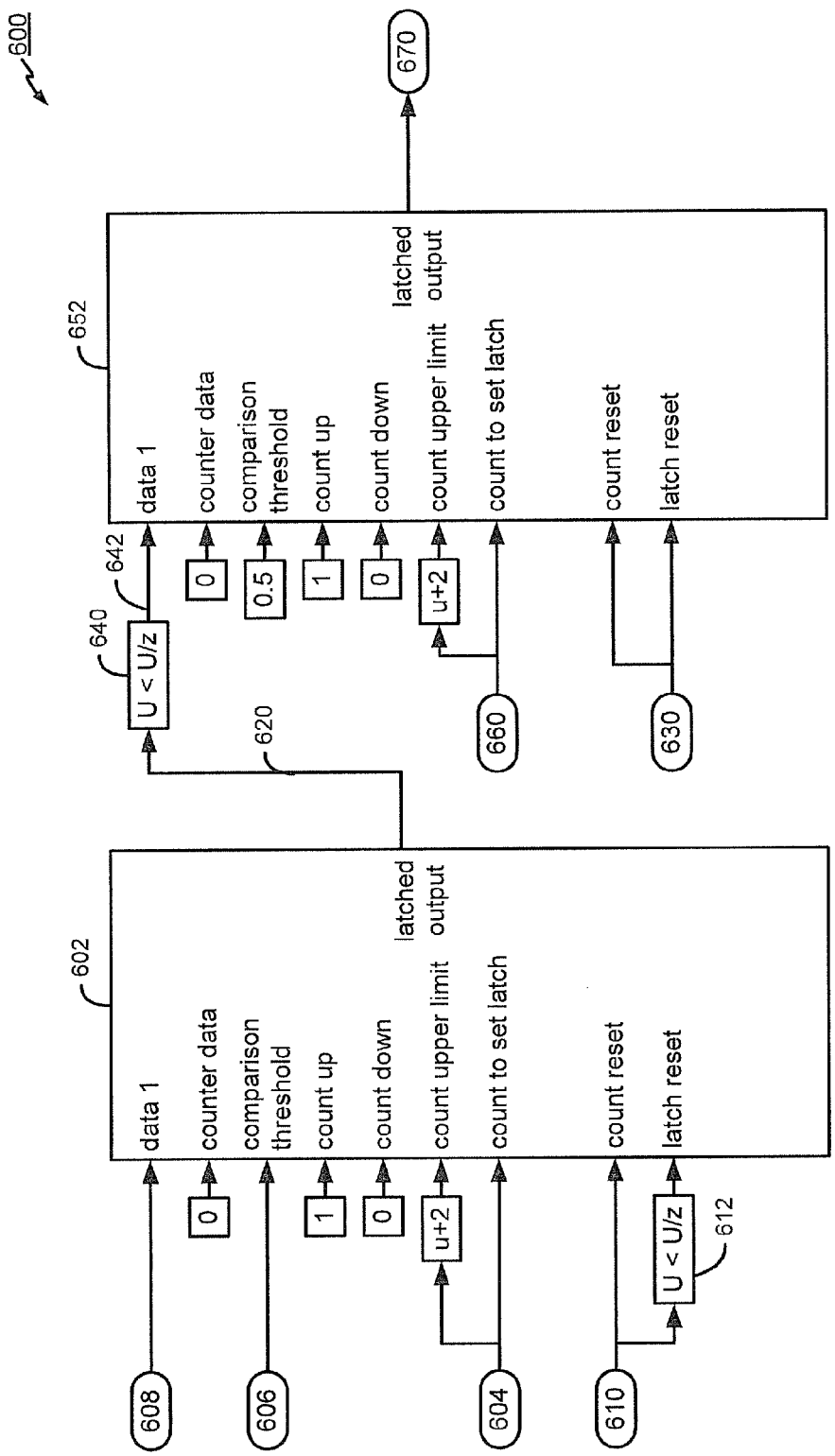
FIG. 6 is an illustrative embodiment of logic configured to generate a latched fault signal.

Thus, when the first signal 530 indicates that oscillatory failure monitoring is to be enabled (i.e., when a CLAW processing module is providing commands to actuators, such as the actuators 160 of FIG. 1), an OFCM module (e.g., the OFCM module 120 of FIG. 1) will synchronize testing of an error signal (e.g., the error signal 206) for a first amount of time based on the amount of time indicate by the second signal 540 (e.g., $T_{on}$) and will synchronize refraining from testing of the error signal for a second amount of time based on the amount of time indicated by the third signal 550 (e.g., $T_{off}$). When the testing of the error signal indicates that the CLAW processing module is to be turned off, the fourth signal 560 (e.g., the latched fault signal 140 of FIGS. 1 and 2) will have a value of one (1), causing the output of the first logic block 502 to be a one (1), which causes the output of the second logic block 504 to be a zero (0), resulting in the test synchronization signal 570 having a zero (0) value. When the test synchronization signal 570 has the zero (0) value, testing of the error signal is not performed and the CLAW processing module is turned off. When the fourth signal 560 has the value of one (1), testing of the error signal may be performed based on whether the first signal 530 has a zero (0) value (e.g., during the time corresponding to $T_{on}$) or a one (1) value (e.g., during the time corresponding to $T_{off}$). When the first signal 530 has the zero (0) value, the output of the third logic block 506 is zero (0) resulting in the test synchronization signal 570 having a zero (0) value and testing of the error signal may not be performed. When the first signal 530 has the one (1) value, the output of the third logic block 506 is one (1) resulting in the test synchronization signal 570 having a one (1) value and testing of the error signal may be performed. Referring to FIG. 6, an illustrative embodiment of logic 600 configured to generate a latched fault signal is shown. It is noted that other implementations of logic configured perform the operations of the 600 may be used and that FIG. 6 is merely illustrative of one possible implementation of the logic 600. In an embodiment, the logic 600 may correspond to or is included within the oscillatory amplitude exceedence test module 222 and/or the oscillatory failure persistence test module 224 of FIG. 2. In an embodiment, the logic 600 may be implemented as instructions stored on a computer-readable medium (e.g., a hard disk drive, a memory). The instructions may be executable by a processor to perform the various functions described with reference to FIGS. 2 and 6. In an additional or alternative embodiment, the logic 600 may be implemented as circuitry configured to perform the various functions described with reference FIGS. 2 and 6. The circuitry may include a field-programmable gate array (FPGA) device, an application-specific integrated circuit (ASIC), a processing unit such as a central processing unit (CPU), a controller, a firmware device, or another hardware device configured to perform the various functions described with reference to FIGS. 2 and 6.

As shown in FIG. 6, the logic 600 includes a first counter 602, signal detection logic 640, and a second counter 652. The first counter 602 may be configured to receive a first signal 604, a second signal 606, a third signal 608, and a fourth signal 610. The first signal 604 may correspond to a first OFCM detection monitor parameter of the one or more OFCM detection monitor parameters 250 generated by the dynamic loads test management module 214 of FIG. 2 (e.g., the outcome of EQ-3 and EQ-4). The second signal 606 may correspond to a second OFCM detection monitor parameter of the one or more OFCM detection monitor parameters 250 generated by the dynamic loads test management module 214 of FIG. 2 (e.g., the outcome of EQ-5). The third signal 608 may correspond to the error signal 206 generated by the signal generation module 202 of FIG. 2. The fourth signal 610 may correspond to the synchronization signal 228 generated by the test sequencer module 220 of FIG. 2 or the test synchronization signal 570 generated by the logic 500 of FIG. 5. The first counter 602 may be configured to generate, based on the signals 604, 606, 608, 610, a first output signal 620.

The signal detection logic 640 may be configured to detect a leading edge of the first output signal 620 and to generate a failure pulsetrain signal 642. The failure pulsetrain signal 642 may correspond to the 226 of FIG. 2. The signal detection logic 640 may be configured to provide the failure pulsetrain signal 642 to the second counter 652.

The second counter 652 may be configured to receive the failure pulsetrain signal 642, a fifth signal 630, and a sixth signal 660. The fifth signal 630 may correspond to the reset signal 128 of FIGS. 1 and 2. The sixth signal 660 may correspond to the OFCM detection monitor parameter 260 of FIG. 2 (e.g., the output of EQ-6).

During an amplitude exceedence test window (e.g., $T_{on}$), the logic 600 may be configured to detect, based on the second signal 606 and the third signal 608, when a dynamic load experienced by a component of an aircraft exceeds a threshold dynamic load. The logic 600 may be configured to generate a latched fault signal 670 that indicates whether the dynamic loads have been exceeded for a threshold number of testing cycles (e.g., a threshold number of failed amplitude exceedence test windows). Thus, the latched fault signal 670 may indicate that the dynamic loads indicated by the third signal 608 have exceeded the threshold dynamic load indicated by the third signal 608 for the threshold number of times (e.g., the maximum number of failed amplitude exceedence test windows) indicated by the sixth signal 660. In a particular embodiment, the latched fault signal 670 corresponds to the latched fault signal 140 of FIGS. 1 and 2. The latched fault signal 670 may have a first value (e.g., a zero (0)) or a second value (e.g., a one (1)). When the latched fault signal 670 has the first value, a CLAW processing module (e.g., the CLAW processing module of FIG. 1) may be turned on and when the latched fault signal 670 has the second value, the CLAW processing module may be turned off.

During operation, the first counter 602 may receive the signals 604-610 and determine whether an amount of energy associated with the third signal 608 exceeds an amplitude threshold indicated by the second signal 606. When the amount of energy associated with the third signal 608 exceeds the amplitude threshold, the first counter 602 may be configured to increment a counter up by a count up value, such as the count up value one (1) shown in FIG. 6. When the amount of energy associated with the third signal 608 does not exceed the amplitude threshold indicated by the 606, the first counter 602 may be configured to decrement the counter up by a count down value, such as the count up value zero (0) shown in FIG. 6. The count down value shown in FIG. 6 is zero (0) because an oscillatory failure monitor (OFCM) module (e.g., the OFCM module 120 of FIGS. 1 and 2) is configured to monitor a number of instances that dynamic loads experienced by aircraft components exceed an allowable dynamic load (e.g., a dynamic load threshold). When the number of instances exceeds an allowable number of instances, a CLAW processing module (e.g., the CLAW processing module 116 of FIG. 1) may be turned off, reducing the dynamic loads experienced by the aircraft components due to actuators (e.g., the actuators 160 of FIG. 1) no longer being controlled, at least in part, by commands from the CLAW processing module. Because the OFCM module is only concerned with when the dynamic loads exceed the dynamic loads threshold, there is no need to decrement the counter until the first counter 602 is reset using the fourth signal 610. In a particular embodiment, the fourth signal 610 may be provided to the signal detection logic 612. The signal detection logic 612 may be configured to detect a change in value of the fourth signal 610 and, in response to detecting the change, the output (e.g., the first output signal 620) of the first counter 602 may be zero. Additionally, the count value stored as the counter data of the first counter 602 may be reset to zero (0) when the fourth signal 610 is one (1) (i.e., during a time period corresponding to $T_{off}$).

The first counter 602 may be configured to generate the first output signal 620 based on whether the amount of energy associated with the third signal 608 exceeds the amplitude threshold during an amplitude exceedence test window (e.g., during $T_{on}$). For example, when the amount of energy associated with the third signal 608 exceeds the amplitude threshold during the amplitude exceedence test window, the first counter 602 may be configured to provide the first output signal 620 having a first value (e.g., a one (1)) to the signal detection logic 640. When the amount of energy associated with the third signal 608 does not exceed the amplitude threshold during the amplitude exceedence test window, the first counter 602 may be configured to provide the first output signal 620 having a second value (e.g., a zero (0)) to the signal detection logic 640.

The signal detection logic 640 may be configured to detect a leading edge of the signal 620 and to generate failure pulsetrain signal 642 that is provided to the second counter 652. The failure pulsetrain signal 642 generated by the signal detection logic 640 may have a first value (e.g., a zero (0)) indicating that the amount of energy associated with the third signal 608 did not exceed the amplitude threshold during the amplitude exceedence test window or a second value (e.g., a one (1)) indicating that the amount of energy associated with the third signal 608 exceeded the amplitude threshold during the amplitude exceedence test window. For example, when a leading edge of the first output signal 620 is detected, the second value (e.g., the one (1)) may be inserted as a pulse in the failure pulsetrain signal 642. The pulse in the failure pulsetrain signal 642 indicates that the amount of energy associated with the third signal 608 exceeded the amplitude threshold during the amplitude exceedence test window (e.g., during $T_{on}$).

In response to receiving the failure pulsetrain signal 642 at the second counter 652, the second counter 652 may compare the value of the failure pulsetrain signal 642 to a comparison threshold. The comparison threshold of the second counter 652 may be configured to detect when the failure pulsetrain signal 642 is greater than zero (0). Thus, the comparison threshold of the second counter 652 may set to 0.5, as shown in FIG. 6. In other embodiment, other comparison thresholds may be used by the second counter 652. A value stored, designated counter data in FIG. 6, may be in the counter of the second counter 652 may be incremented or decremented based on the comparison of the value of the failure pulsetrain signal 642 to the threshold. For example, when the value of the failure pulsetrain signal 642 corresponds to the first value (e.g., the zero (0)), the value of the failure pulsetrain signal 642 is less than the threshold and the counter of the second counter 652 may be decremented by a count down value, such as the count down value of zero (0) shown in FIG. 6. When the value of the failure pulsetrain signal 642 corresponds to the second value (e.g., the one (1)), the value of the failure pulsetrain signal 642 is greater than threshold and the counter value of the counter of the second counter 652 may be incremented by a count up value, such as the count up value one (1) shown in FIG. 6.

The sixth signal 660 may indicate a threshold counter value indicating a maximum number of pulses in the failure pulsetrain signal 642 that may be detected at the second counter 652 before a CLAW processing module (e.g., the CLAW processing module 116 of FIG. 1) is to be turned off. When the counter value of the second counter 652 does not exceed the threshold counter value, the latched fault signal 670 having the first value (e.g., the zero (0)) and the CLAW processing module may remain turned on. When the counter value of the second counter 652 exceeds the threshold counter value indicated by the 660, the second counter 652 may be configured to generate the latched fault signal 670 having the second value (e.g., the one (1)) and the CLAW processing module may be turned off.

Thus, the first counter 602 is configured to perform an amplitude exceedence test (i.e., compare the second signal 606 and the third signal 608) and the second counter 652 is configured to perform an amplitude exceedence persistence test (i.e., count the number of failed amplitude exceedence tests). The first counter 602 performs the amplitude exceedence test to detect when the dynamic load indicated by the third signal 608 exceeds the threshold dynamic load indicated by the second signal 606 during each amplitude exceedence test window (i.e., during each $T_{on}$ time period) and the failure pulsetrain signal 642 indicates a results of each amplitude exceedence test to the second counter 652. The second counter 652 is configured to count the number of failed amplitude exceedence tests (as indicated by the failure pulsetrain signal 642) to detect when a threshold number of failed amplitude exceedence tests have occurred.

In a particular embodiment, the CLAW processing module may remain turned off once the latched fault signal 670 has the second value (e.g., the one (1)) until the fifth signal 630 indicates that the second counter 652 is to be reset (i.e., reset the latched fault signal 670). The fifth signal 630 may be configured to require a manual reset by maintenance personnel. For example, because the CLAW processing module is turned off after the second counter 652 determines that the dynamic loads experienced by the components of the aircraft have exceeded the dynamic loads threshold for the threshold number of instances (i.e., exceeded the allowable dynamic loads a particular number of times), the CLAW processing module may remain turned off for a remaining duration of a flight. Once the aircraft has landed, the maintenance personnel may perform maintenance and inspection operations on the components of the aircraft to verify the structural integrity of the components and to verify that no damage to the components was caused by the dynamic loads experience by the components during the flight. If the maintenance personnel determine that no damage was caused, or after the maintenance personnel have repaired or replaced any damaged components, the maintenance personnel may reset a flight control computer to generate a reset fifth signal 630, enabling the CLAW processing module to be turned on during a subsequent flight. Thus, the logic 600 is configured to automatically disable a CLAW processing module during a flight of an aircraft when dynamic loads experienced by components of the aircraft exceed a threshold number of times. An illustrative embodiment of the timing of the signals generated and processed by the first counter 602, the signal detection logic 640, and the second counter 652 is described with reference to FIG. 10.

Additionally, the test limits (e.g., the values corresponding to the signals 606, 610, 630, 660) are set dynamically by a management module (e.g., the management module 124) based on a frequency (e.g., the frequency 218 of FIG. 2) of sensed signals (e.g., the signals 136, 138 of FIGS. 1 and 2). Thus, test limits may be dynamically determined during a plurality of different flight conditions based on a frequency signal.

Figure 7:
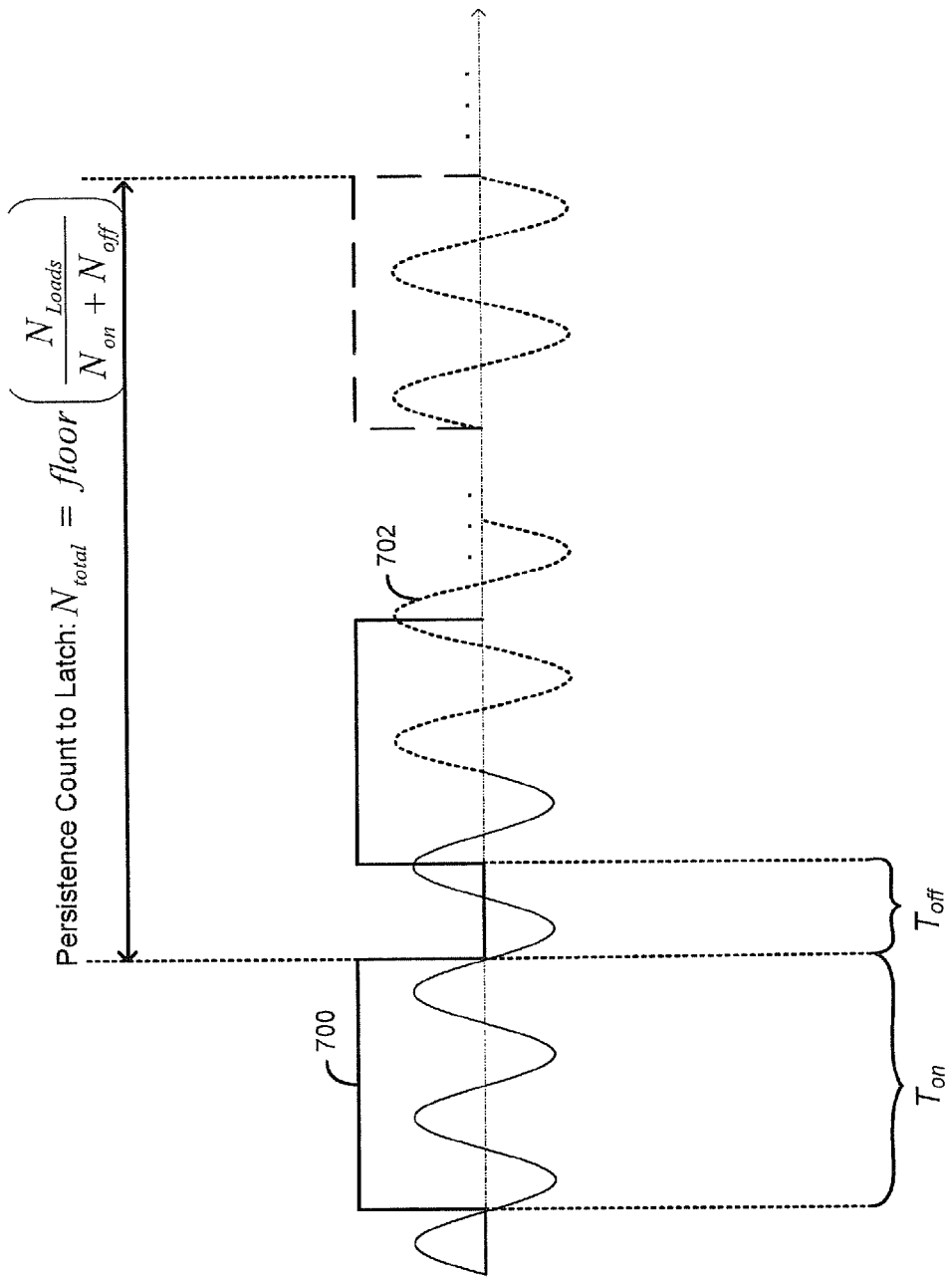
FIG. 7 is an illustrative embodiment of a control signal generated by a test sequencing management module.

Referring to FIG. 7, an illustrative embodiment of a control signal 700 generated by a test sequencing management module is shown. In FIG. 7, a signal 702 and the control signal 700 are shown. In a particular embodiment, the signal 702 may correspond to the error signal 206 of FIG. 2 and the control signal 700 may correspond to the OFCM detection monitor parameter 240 of FIG. 2. For example, the control signal 700 may have a first value (e.g., a zero (0)) or a second value (e.g., a one (1)). When the control signal 700 corresponds to the first value, the control signal 700 may indicate that testing of an error signal (e.g., the error signal 206) is not to be performed (e.g., $T_{off}$). When the control signal 700 corresponds to the second value, the control signal 700 may indicate that the error signal (e.g., the error signal 206) is to be tested (e.g., $T_{on}$).

Figure 8:
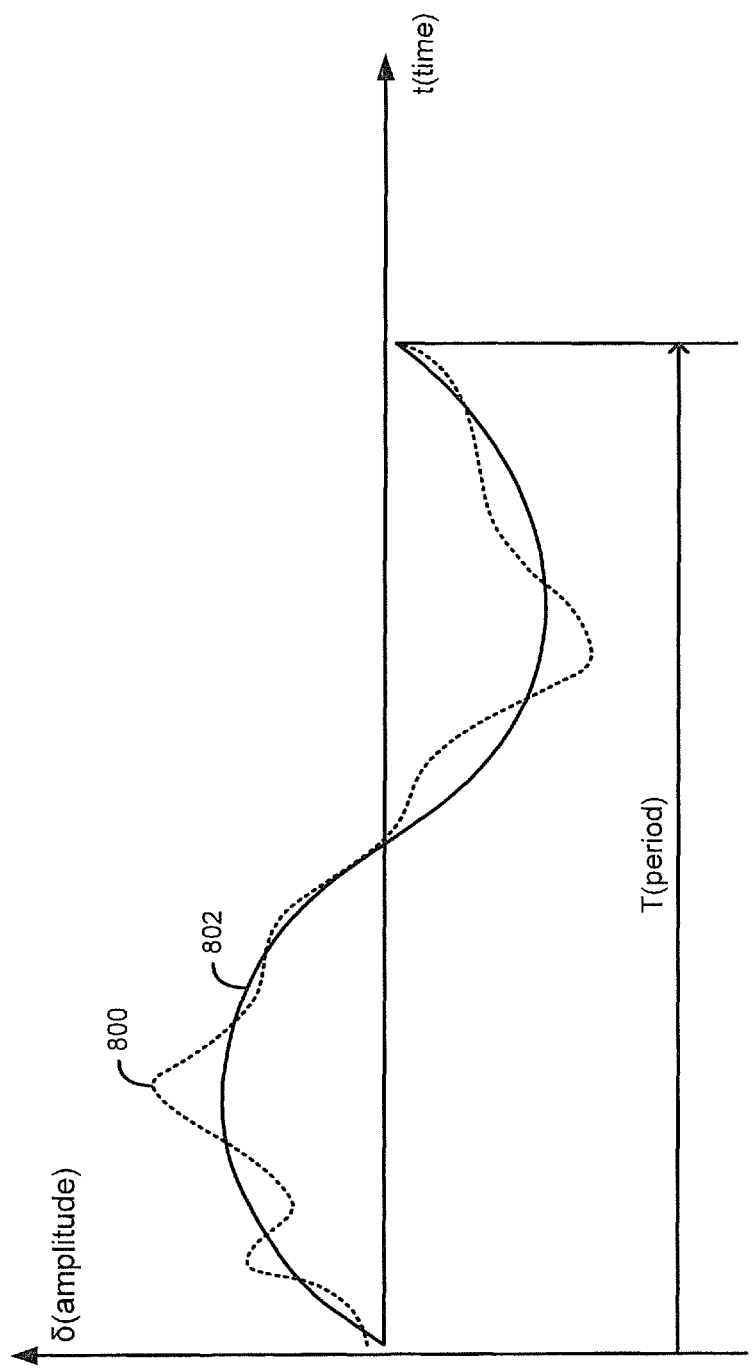
FIG. 8 is an illustrative embodiment of an error signal and a waveform that is an energy equivalent waveform of the error signal.

Referring to FIG. 8, an illustrative embodiment of an error signal 800 and a waveform 802 that is an energy equivalent sinusoidal waveform of the error signal 800 is shown. As shown in FIG. 8, the error signal 800 may have an irregular waveform. The energy equivalent waveform 802 may correspond to the error signal 206 after being filtered by the filter module 204 of FIG. 2 and may be a sinusoidal waveform having a same period (T) as the error signal 800. The energy equivalent waveform 802 may be determined such that the energy equivalent waveform 802 has a same amount of energy (e.g., an area of the signal 802) as an amount of energy (e.g., an area of the error signal 800) as the error signal 800. In a particular embodiment, the error signal 800 may correspond to the error signal 206 of FIG. 2 and the energy equivalent waveform 802 may correspond to the dynamic loads requirements. The amount of energy of the error signal 800 and the energy equivalent waveform 802 may indicate a dynamic load experienced by a component of an aircraft.

Figure 9:
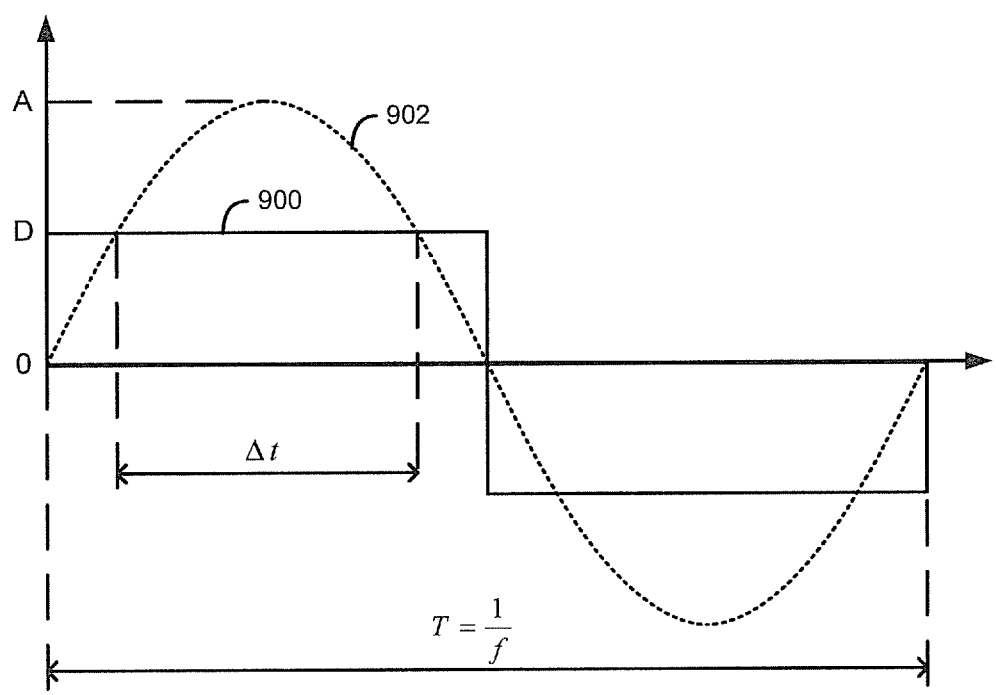
FIG. 9 is an illustrative embodiment of an energy equivalent square waveform and a frequency curve.

Referring to FIG. 9, an illustrative embodiment of an energy equivalent square waveform 900 and an error signal 902 are shown. In an embodiment, the error signal 902 corresponds to the dynamic loads allowables with a peak amplitude (A). The energy equivalent square waveform 900 may be generated based on a frequency (e.g., the frequency 218 of FIG. 2) of the error signal 902 using EQ-5, as described with reference to FIG. 2. In a particular embodiment, the energy equivalent square waveform 900 may correspond to the OFCM detection monitor parameter 250 of FIG. 2.

Figure 10:
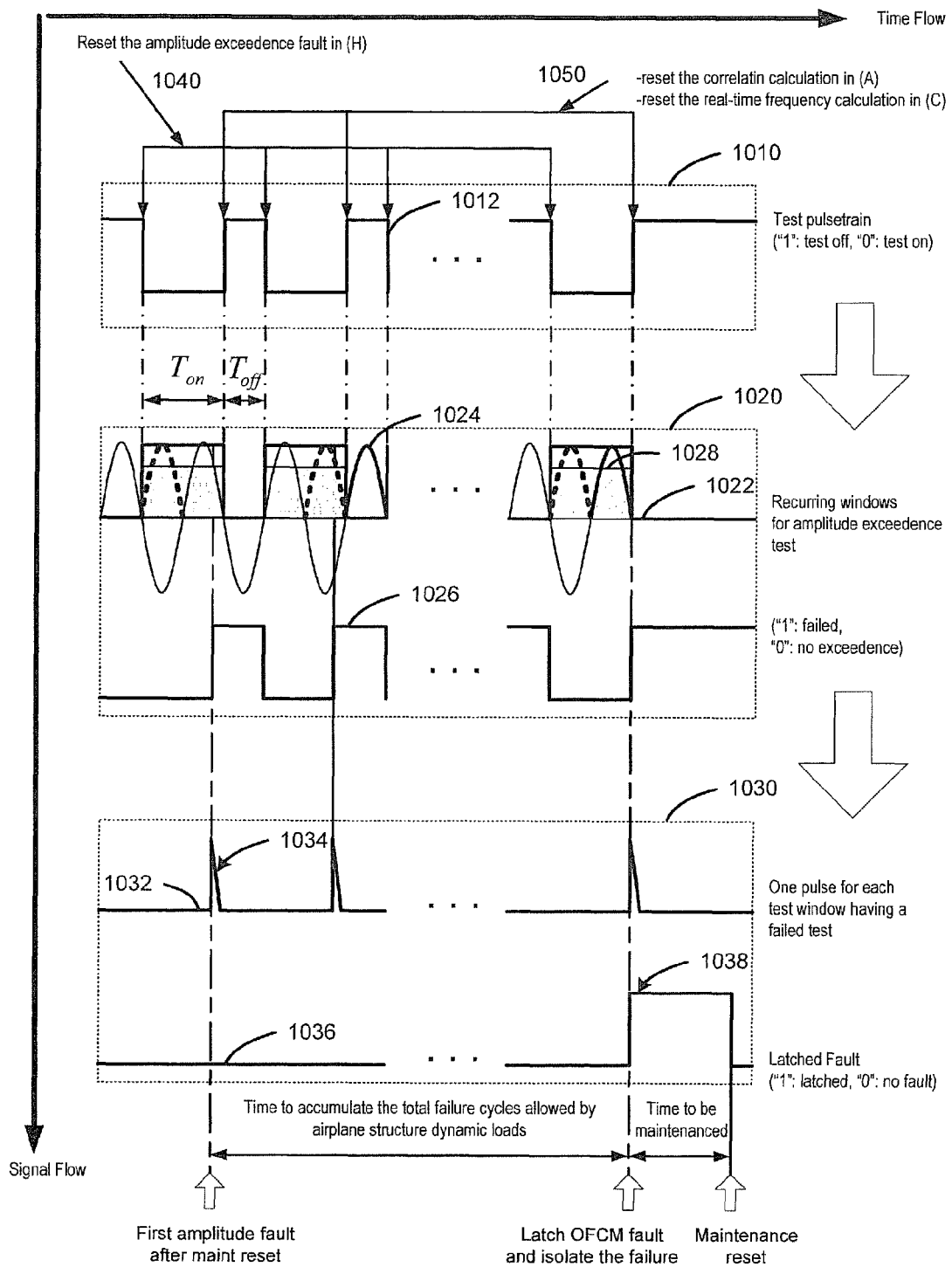
FIG. 10 is a timing diagram of operations of an oscillatory failure common mode monitor (OFCM) module.

Referring to FIG. 10, a timing diagram of operations of an oscillatory failure common mode monitor (OFCM) module is shown. As shown in FIG. 10, a block 1010 includes a signal 1012. In a particular embodiment, the signal 1012 corresponds to the synchronization signal 228 of FIG. 2 and the block 1010 corresponds to an output of a test sequencer module (e.g., the test sequencer module 220 of FIG. 2) over time. As shown in FIG. 10, the signal 1012 may have a first value (e.g., a zero (0)) or a second value (e.g., a one (1)). When the signal 1012 has the first value, an OFCM module may monitor an error signal (i.e., test the error signal for amplitude exceedence). When the signal 1012 has the second value, the OFCM module may not monitor the error signal.

FIG. 10 also shows a block 1020 illustrating operation of the oscillatory amplitude exceedence test module 222 of FIG. 2 and the second counter 652 of FIG. 6. The block 1020 includes a signal 1022, which corresponds to an inverse of the synchronization signal 228 of FIG. 2. The block 1020 includes a signal 1024, which corresponds to the error signal 206 of FIG. 2. The block 1020 includes a signal 1026, which corresponds to the failure pulsetrain 226 of FIG. 2 and the signal 620 of FIG. 6. The block 1020 includes a signal 1028, which corresponds to the OFCM detection monitor parameter 250 of FIG. 2.

As shown in FIG. 10, the signal 1022 may have a first value (e.g., a one (1)) or a second value (e.g., a zero (0)). When the signal 1022 indicates that amplitude exceedence testing is to be performed (e.g., $T_{on}$) and the amplitude of the signal 1024 exceeds the amplitude of the signal 1028, the signal 1026 may have the first value (e.g., a one (1)) indicating that the dynamic load exceeds a dynamic load threshold (e.g., an allowable dynamic load) during the test window ($T_{on}$). When the signal 1026 has the second value (e.g., the zero (0)), the signal 1026 indicates that the dynamic loads associated with the signal 1024 do not exceed the dynamic load threshold during the test window ($T_{on}$). The signal 1026 may be reset to the second value (e.g., the zero (0)) based on the signal 1040. For example, at the start of each test window ($T_{on}$), the signal 1040 may cause the signal 1026 to be set to the second value. In a particular embodiment, the signal 1040 may correspond to the signal 610 of FIG. 6. Thus, in the block 1020, the signal 1026 is generated as a pulse train with a first value indicating that an amplitude of the signal 1024 exceeded a threshold amplitude during a corresponding amplitude exceedence test window (e.g., $T_{on}$) and a second value indicating that the amplitude of the signal 1024 did not exceed the threshold amplitude during a corresponding amplitude exceedence test window (e.g., $T_{on}$).

FIG. 10 also shows a block 1030 illustrating operations to the oscillatory failure persistence test module 224 of FIG. 2 or the second counter 652 of FIG. 6. The block 1030 includes a signal 1032 which corresponds to the failure pulsetrain signal 642 of FIG. 6. The signal 1032 may be used to determine a number of tests for which the dynamic loads indicated by the signal 1024 exceeded the dynamic load threshold. For example, the signal 1032 may correspond to an output of the signal detection logic 640 of FIG. 6. When the signal detection logic 640 detects a leading edge of the signal 1026, the signal detection logic 640 may generate a pulse, such as a pulse 1034. When the second counter 652 receives the signal 1032 and detects the pulse 1034, the second counter 652 may increment the counter of the second counter 652. When a leading edge of another pulse of the signal 1032 is detected, and the counter of the second counter 652 is incremented such that the count value exceeds a threshold count value (e.g., the count value indicated by the OFCM detection monitor parameter 260), a latched fault signal 1036 may be latched to one (1) as indicated at 1038.

As shown in FIG. 10, once the count value associated with the counter of the second counter 652 exceeds the threshold count value, the signal 1036 may remain at one (1) until after maintenance of the aircraft has been performed and the OFCM module is reset. Additionally, as shown in FIG. 10, at the end of each test window ($T_{on}$), a signal 1050 may be configured to cause the OFCM module to reset particular operations, such as the operations performed by the signal generation module 202 and the frequency calculation module 210 of FIG. 2. Thus, during the time between each test window ($T_{on}$) the OFCM module may begin generating signals (e.g., a subsequent error signal 206, a subsequent frequency curve 218, and subsequent control signals 240, 250, 260) in preparation for a subsequent test window ($T_{on}$).

Figure 11:
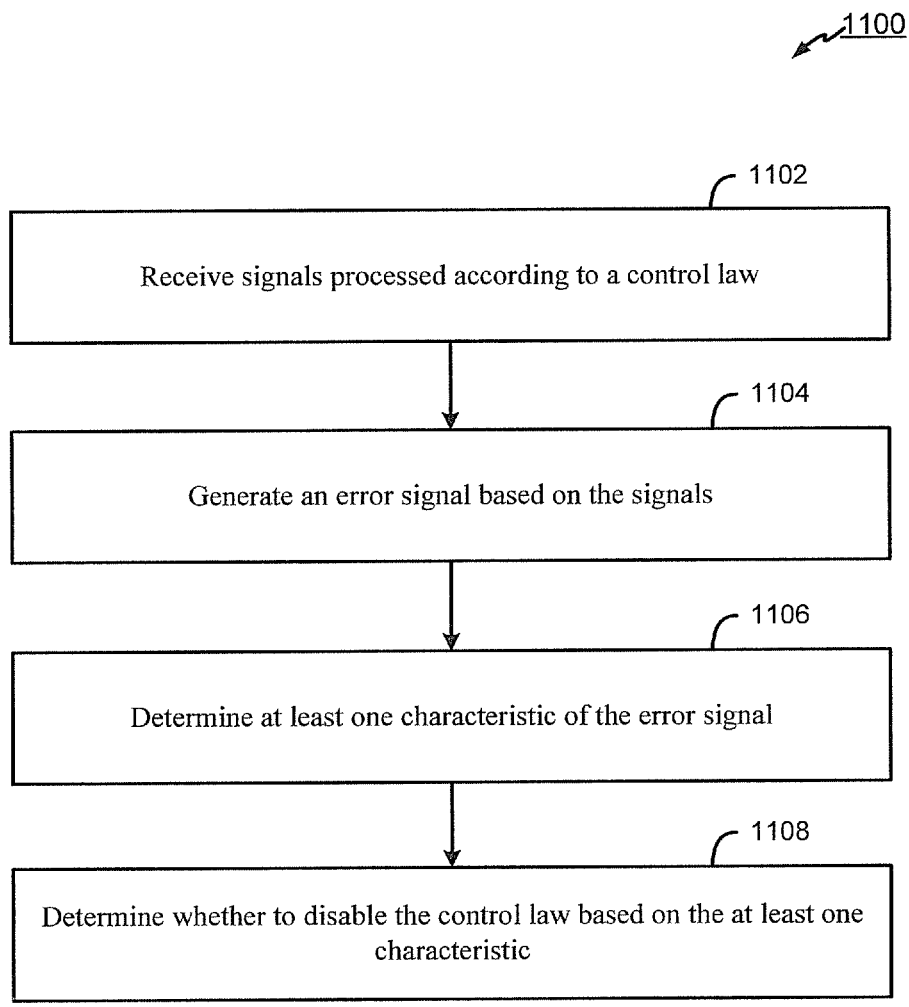
FIG. 11 is a flowchart of a method of performing oscillatory failure common mode (OFCM) monitoring.

Referring to FIG. 11, a flowchart of a method 1100 of performing oscillatory failure common mode (OFCM) monitoring is shown. The method 1100 includes, at 1102, receiving signals processed according to a control law (CLAW). In a particular embodiment, the signals processed according to the CLAW correspond to the signals 136, 138 of FIGS. 1 and 2 and may be received at an OFCM module (e.g., the OFCM module 120 of FIGS. 1 and 2). At 1104, the method 1100 includes generating an error signal based on the signals. In a particular embodiment, the error signal may correspond to the error signal 206 of FIG. 2 and may be generated at a signal generation module (e.g., the signal generation module 202 of FIG. 2).

At 1106, the method 1100 includes determining at least one characteristic of the error signal. In a particular embodiment, the at least one characteristic of the error signal may correspond to a frequency of the error signal and may be determined by a frequency calculation module (e.g., the frequency calculation module 210 of FIG. 2). In an embodiment, the at least one characteristic of the error signal may correspond to an amount of energy associated with the error signal, an amount of energy associated with a dominant energy (e.g., lower frequency components) of the error signal, a square wave having a same amount of energy as the error signal, an amount of energy of a square wave having a same amount of energy as the error signal, an amplitude of the error signal, a period of the error signal, or a combination thereof. At 1008, the method 1100 includes determining whether to disable the CLAW based on the at least one characteristic. In a particular embodiment, determining whether to disable the CLAW based on the at least one characteristic may include determining whether an amplitude of the error signal exceeds a threshold amplitude for a threshold period of time, as described with reference to FIGS. 1-10. In a particular embodiment, a monitoring module (e.g., the monitoring module 126 of FIGS. 1 and 2) may determine whether the amplitude of the error signal exceeds the threshold amplitude for the threshold period of time, as described with reference to FIGS. 1-10.

Figure 12:
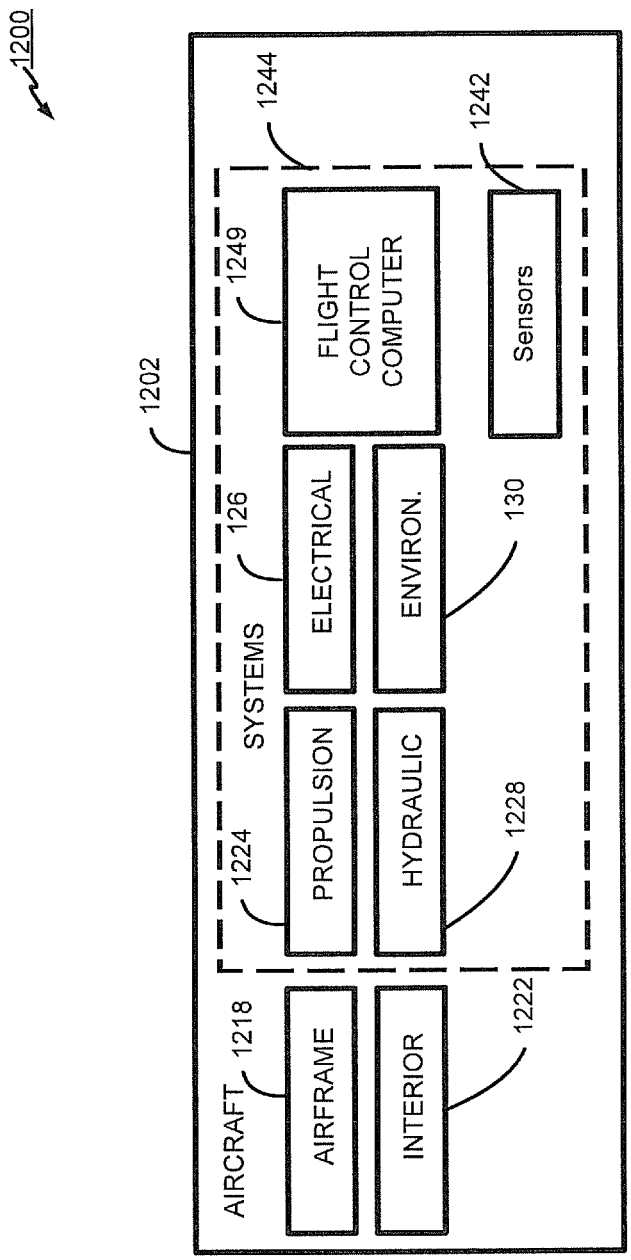
FIG. 12 is an illustrative embodiment of an aircraft including a flight control computer configured to perform oscillatory failure monitoring according to FIGS. 1-11.

Referring to FIG. 12, a block diagram of an aircraft 1200 including a flight control computer configured to perform oscillatory failure common mode monitoring (OFCM) according to the embodiments described with reference to FIGS. 1-11 is shown. As shown in FIG. 12, an aircraft 1202 may include an airframe 1218 with a plurality of systems 1220 and an interior 1222. Examples of high-level systems 1220 include one or more of a propulsion system 1224, an electrical system 1226, a hydraulic system 1226, an environmental system 1230, a sensor system 1242, and a flight control computer 1244. The sensor system 1242 may include sensors corresponding to the sensor device(s) 104, 106 of FIG. 1. The flight control computer 1244 may correspond to the flight control computer 102 of FIG. 1 and may be configured to perform OFCM monitoring according to the various embodiments described with reference to FIGS. 1-11. Any number of other systems may be included. Although an aerospace example is shown, the principles of the invention may be applied to other industries, such as the automotive industry.

The illustrations of the embodiments described herein are intended to provide a general understanding of the structure of the various embodiments. The illustrations are not intended to serve as a complete description of all of the elements and features of an apparatus and/or systems that may utilize the structures or methods described herein. For example, one or more of the embodiments described herein may be implemented as instructions stored on a computer-readable medium (e.g., a hard disk drive, a memory). The instructions may be executable by a processor to perform the various functions described with reference the embodiments disclosed herein. Additionally or alternatively, the embodiments described herein may be implemented as circuitry configured to perform the various functions described with reference the embodiments disclosed herein. In a particular embodiment, the circuitry may include a field-programmable gate array (FPGA) device, an application-specific integrated circuit (ASIC), a processing unit such as a central processing unit (CPU), a controller, a firmware device, or another hardware device configured to perform the various functions described with reference the embodiments disclosed herein.

Further, many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may have been grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
   receiving signals processed according to a control law;
   generating an error signal based on the signals;
   determining at least one characteristic of the error signal, wherein the at least one characteristic includes a frequency of the error signal;
   generating a control signal based on the frequency, wherein the error signal is updated based on the control signal;
   generating a test signal based on the control signal, wherein the error signal is updated based on the test signal, and wherein the control signal is updated based on the test signal; and
   determining whether to disable the control law based on the at least one characteristic.

2. The method of claim 1, wherein the signals processed according to the control law include a first signal generated by a first sensor and a second signal generated based on an output of a second sensor that is of a different type than a type of the first sensor.

3. The method of claim 2, further comprising determining a difference between the first signal and the second signal, wherein the error signal is generated based on the difference between the first signal and the second signal.

4. The method of claim 3, further comprising adjusting a phase delay of the first signal relative to the second signal before generating the error signal.

5. The method of claim 1, wherein the at least one characteristic of the error signal corresponds to a measurement of an amount of energy associated with the error signal.

6. The method of claim 5, further comprising:
   determining whether the measurement of the amount of energy associated with the error signal exceeds a threshold amount of energy; and
   generating an output signal that indicates whether the amount of energy associated with the error signal exceeds the threshold amount of energy, wherein the output signal indicates a first value when the amount of energy associated with the error signal exceeds the threshold amount of energy, and wherein the output signal indicates a second value when the amount of energy associated with the error signal does not exceed the threshold amount of energy.

7. The method of claim 6, further comprising:
   incrementing a counter when the output signal indicates the first value;
   determining whether the counter exceeds a threshold count value; and
   disabling the control law when the counter exceeds the threshold count value.

8. The method of claim 1, wherein the control law is associated with gust, and wherein the error signal indicates a dynamic load experienced by a component of an aircraft.

9. A system comprising:
   a processor;
   a demodulation module executable by the processor to:
      receive signals processed according to a control law; and
      generate an error signal based on the signals;
   a detection management module executable by the processor to:
      determine at least one characteristic of the error signal, wherein the at least one characteristic includes a frequency of the error signal; and
      generate a control signal based on the frequency; and
   a monitoring module executable by the processor to:
      determine whether to disable the control law based on the at least one characteristic;
      receive the control signal from the detection management module;
      generate a test signal based on the control signal; and
      provide the test signal to the demodulation module and to the detection management module.

10. The system of claim 9, wherein the at least one characteristic of the error signal corresponds to a measurement of an amount of energy associated with the error signal.

11. The system of claim 10, wherein the monitoring module is executable by the processor to filter the error signal prior to providing the error signal to the detection management module.

12. The system of claim 10, wherein the monitoring module is executable by the processor to:
   determine whether the measurement of the amount of energy associated with the error signal exceeds a threshold amount of energy; and
   generate an output signal that indicates whether the amount of energy associated with the error signal exceeds the threshold amount of energy, wherein the output signal indicates a first value when the amount of energy associated with the error signal exceeds the threshold amount of energy, and wherein the output signal indicates a second value when the amount of energy associated with the error signal does not exceed the threshold amount of energy.

13. The system of claim 12, wherein the monitoring module is executable by the processor to:
   increment a counter when the output signal indicates the first value;
   determine whether the counter exceeds a threshold count value; and
   disable the control law when the counter exceeds the threshold count value.

14. The system of claim 9, wherein the signals processed according to the control law include a first signal generated by a first sensor and a second signal generated based on an output of a second sensor that is of a different type than a type of the first sensor, and wherein the demodulation module is further executable by the processor to determine a difference between the first signal and the second signal, wherein the error signal is generated based on the difference between the first signal and the second signal.

15. The system of claim 9, wherein the detection management module is executable by the processor to count a number of instances that an oscillatory waveform associated with the error signal crosses a threshold value during a period of time, and wherein the frequency is determined based on the number of instances that the oscillatory waveform crossed the threshold value during the period of time.

16. The system of claim 9, wherein the control law is associated with gust, and wherein the error signal indicates a dynamic load experienced by a component of an aircraft.

17. The system of claim 9, wherein the signals processed according to the control law include a first signal generated by a first sensor and a second signal generated based on an output of a second sensor that is of a different type than a type of the first sensor, and wherein the demodulation module is executable by the processor to:
   estimate a phase difference of the first signal relative to the second signal;
   generate a first delayed signal based on the first signal, wherein the first delayed signal corresponds to the first signal and has phase delay corresponding to the phase difference of the first signal relative to the second signal; and
   generate the error signal based on a difference between the first delayed signal and the second signal.

18. The system of claim 17, wherein the first sensor is configured to monitor airframe structure dynamic loads of an aircraft.

19. A computer-readable storage medium comprising instructions that, when executed by a processor, cause the processor to:
   receive signals processed according to a control law;
   generate an error signal based on the signals;
   determine at least one characteristic of the error signal, wherein the at least one characteristic includes a frequency of the error signal;
   generate a control signal based on the frequency, wherein the error signal is updated based on the control signal;
   generate a test signal based on the control signal, wherein the error signal is updated based on the test signal, and wherein the control signal is updated based on the test signal; and
   determine whether to disable the control law based on the at least one characteristic.

20. The computer-readable storage medium of claim 19, wherein the signals processed according to the control law include a first signal and a second signal, further comprising instructions that, when executed by the processor, cause the processor to determine a difference between the first signal and the second signal, wherein the first signal is generated by a first sensor, wherein the second signal is generated based on an output of a second sensor that is of a different type than a type of the first sensor, and wherein the error signal is generated based on the difference between the first signal and the second signal.

* * * * *